(12) United States Patent
Tamaki

(10) Patent No.: US 11,968,445 B2
(45) Date of Patent: Apr. 23, 2024

(54) CONTROL APPARATUS FOR DETECTING AND DISPLAYING LINE-OF-SIGHT POSITION, CONTROL METHOD THEREOF, AND RECORDING MEDIUM

(71) Applicant: CANON KABUSHIKI KAISHA, Tokyo (JP)

(72) Inventor: Yoshihito Tamaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/850,831

(22) Filed: Jun. 27, 2022

(65) Prior Publication Data

US 2023/0007184 A1    Jan. 5, 2023

(30) Foreign Application Priority Data

Jun. 30, 2021 (JP) .................................. 2021-109537

(51) Int. Cl.
*H04N 23/67* (2023.01)
*H04N 23/63* (2023.01)

(52) U.S. Cl.
CPC ......... *H04N 23/671* (2023.01); *H04N 23/632* (2023.01); *H04N 23/672* (2023.01)

(58) Field of Classification Search
CPC .. H04N 23/671; H04N 23/632; H04N 23/672; H04N 23/62; H04N 23/667; H04N 23/60
See application file for complete search history.

(56) References Cited

U.S. PATENT DOCUMENTS

| 6,433,759 B1* | 8/2002 | Richardson ............. G06F 3/013 345/157 |
| 9,996,150 B2* | 6/2018 | Swaminathan ........ G06V 20/20 |
| 10,048,751 B2* | 8/2018 | Jaafar ..................... G06F 16/58 |
| 10,401,960 B2* | 9/2019 | Khalid .................... G06F 3/011 |
| 11,016,558 B2* | 5/2021 | Sugihara ................ G06F 3/165 |
| 11,281,291 B1* | 3/2022 | Balaji ..................... G06F 3/011 |
| 11,509,816 B2* | 11/2022 | Ebata ................... H04N 23/632 |
| 11,526,264 B2* | 12/2022 | Matsui ................ G06F 3/04883 |
| 11,592,899 B1* | 2/2023 | Haine .................. G06F 3/0482 |
| 11,650,660 B2* | 5/2023 | Uchida .................. H04N 23/56 348/78 |
| 2006/0270945 A1* | 11/2006 | Ghajar ................... A61B 5/162 600/558 |
| 2010/0177114 A1* | 7/2010 | Nakashima .......... G02B 27/017 345/589 |
| 2014/0253876 A1* | 9/2014 | Klin ....................... G16H 20/70 351/210 |
| 2016/0231811 A1* | 8/2016 | Elvesjö ................... G06F 3/017 |
| 2016/0239081 A1* | 8/2016 | Imoto ................... G06F 3/0481 |

(Continued)

FOREIGN PATENT DOCUMENTS

JP        2020-119093 A    8/2020

*Primary Examiner* — Chiawei Chen
(74) *Attorney, Agent, or Firm* — Canon U.S.A., Inc. IP Division

(57) ABSTRACT

A control apparatus includes at least one processor configured to acquire information corresponding to a position at which an observer stares, wherein the information indicates a shift in the position, and control a display unit to display an indicator corresponding to the position, wherein, in a case where a shift in the position is continuously smaller than a first threshold a first number of times, a display position of the indicator is not shifted.

14 Claims, 13 Drawing Sheets

(56) References Cited

U.S. PATENT DOCUMENTS

| | | | |
|---|---|---|---|
| 2018/0239440 A1* | 8/2018 | Noda | G06F 3/038 |
| 2018/0289259 A1* | 10/2018 | Klin | A61B 3/0083 |
| 2019/0099072 A1* | 4/2019 | Takii | A61B 3/12 |
| 2019/0147618 A1* | 5/2019 | Sugimoto | G03B 17/00 |
| | | | 348/222.1 |
| 2021/0058562 A1* | 2/2021 | Toguchi | H04N 23/60 |
| 2021/0258472 A1* | 8/2021 | Hamano | H04N 23/667 |
| 2022/0121275 A1* | 4/2022 | Balaji | G06V 40/197 |
| 2022/0121276 A1* | 4/2022 | Saito | G06F 3/017 |
| 2022/0132024 A1* | 4/2022 | Ogawa | H04N 23/632 |
| 2023/0075321 A1* | 3/2023 | David | G06F 3/041 |

* cited by examiner

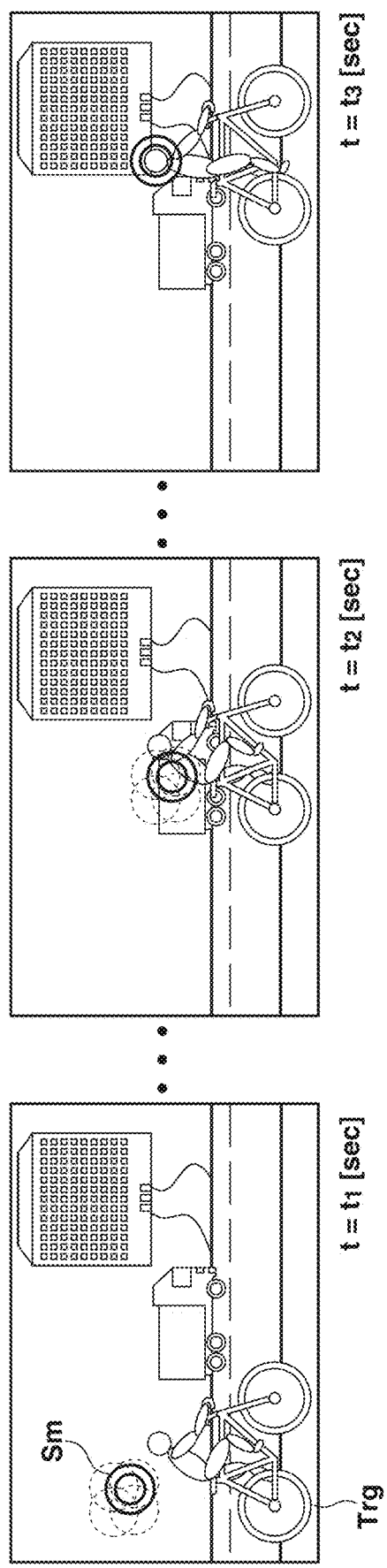

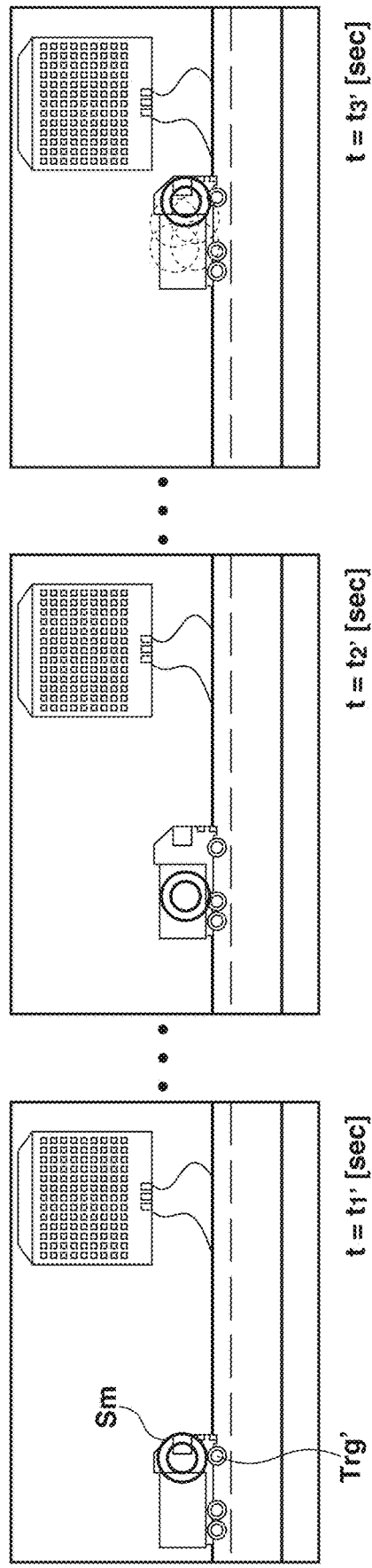

CONTROL APPARATUS FOR DETECTING AND DISPLAYING LINE-OF-SIGHT POSITION, CONTROL METHOD THEREOF, AND RECORDING MEDIUM

BACKGROUND

Field of the Disclosure

The present disclosure relates to a technique for detecting and displaying a line-of-sight position of an observer.

Description of the Related Art

A technique for detecting a line-of-sight position of an observer has been known. Japanese Patent Application Laid-Open No. 2020-119093 discusses a technique for detecting a line-of-sight position of an observer looking into a display unit and displaying an indicator indicating the detected line-of-sight position of the observer on the display unit.

According to Japanese Patent Application Laid-Open No. 2020-119093, because the detected line-of-sight position is visually recognizable, user convenience can be improved. In a case where information about the line-of-sight position of an observer is used as it is, a shift in the line-of-sight position that is not intended by the observer is reflected on the display, which may result in deterioration in display quality and convenience.

SUMMARY

Embodiments of the present disclosure are directed to providing a control apparatus capable of improving display quality and convenience in display of a line-of-sight position and a control method of the control apparatus.

According to an aspect of the present disclosure, a control apparatus includes at least one processor or circuit configured to perform the operations of the following units: an acquisition unit configured to acquire information corresponding to a position at which an observer stares, and a control unit configured to control a display unit to display an indicator corresponding to the position, wherein, in a case where a shift in the position is continuously smaller than a first threshold a first number of times, the control unit does not shift a display position of the indicator.

Further features of various embodiments will become apparent from the following description of exemplary embodiments with reference to the attached drawings.

BRIEF DESCRIPTION OF THE DRAWINGS

FIGS. 8A to 8C illustrate line-of-sight state determination processing according to the first exemplary embodiment.

FIGS. 10A to 10C illustrate a line-of-sight confirmation operation according to the first exemplary embodiment.

DESCRIPTION OF THE EMBODIMENTS

Suitable exemplary embodiments will be described in detail with reference to the accompanying drawings. A first exemplary embodiment will be described.

[Configuration of Electronic Apparatus]

Figure 1:
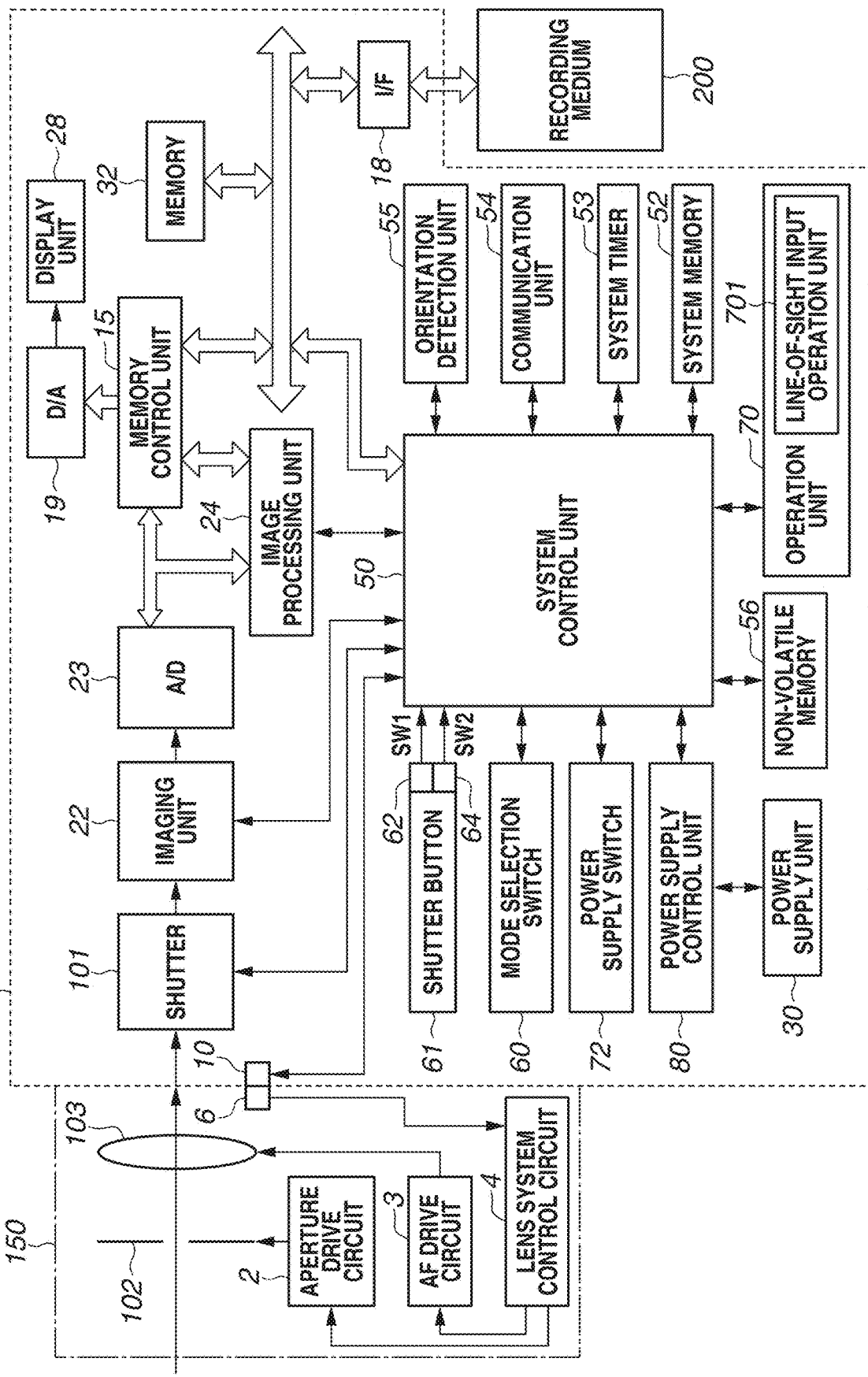
FIG. 1 is a block diagram illustrating a configuration according to a first exemplary embodiment.

FIG. 1 is a block diagram illustrating a configuration of an imaging apparatus including an electronic apparatus according to an exemplary embodiment of the present disclosure. In FIG. 1, a lens unit 150 includes an interchangeable shooting lens. A lens 103 is normally formed of a plurality of lenses. For simplicity, the lens 103 is illustrated as a single lens in FIG. 1. A communication terminal 6 is a communication terminal for the lens unit 150 to communicate with a digital camera 100, and a communication terminal 10 is a communication terminal for the digital camera 100 to communicate with the lens unit 150. The lens unit 150 communicates with a system control unit 50 via these communication terminals 6 and 10. The operation enables a lens system control circuit 4 included in the lens unit 150 to control an aperture 102 via an aperture drive circuit 2 and perform focusing by shifting the position of the lens 103 via an auto focus (AF) drive circuit 3.

A shutter 101 is a focal plane shutter that can freely control the exposure time of an imaging unit 22 under the control of the system control unit 50. The imaging unit 22 is an imaging element including a charge-coupled device (CCD) sensor, a complementary metal-oxide semiconductor (CMOS) sensor, or the like, which converts an optical image into an electrical signal. An analog/digital (A/D) converter 23 converts an analog signal into a digital signal. The A/D converter 23 is used to convert an analog signal output by the imaging unit 22 into a digital signal. The signal obtained from the imaging unit 22 is used not only for imaging but also for exposure control and focus detection control. The imaging unit 22 is provided with pixels each having a divided photoelectric conversion unit with respect to a single micro lens. By dividing a photoelectric conversion unit, an entrance pupil is divided so that a phase difference detection signal can be obtained from each of the divided photoelectric conversion units. An imaging signal can also be obtained by adding up the signals obtained from the divided photoelectric conversion units.

Use of such pixels is advantageous in that the pixels can serve as both focus detection pixels and imaging pixels.

An image processing unit 24 performs predetermined pixel interpolation, resizing processing such as reduction, or color conversion processing on data output by the A/D converter 23 or data output by a memory control unit 15. The image processing unit 24 performs predetermined computation processing by using the captured image data, and the system control unit 50 performs exposure control processing and ranging control processing based on the obtained computation result. The operation enables through-the-lens (TTL) AF processing, auto exposure (AE) processing, and flash preliminary emission (EF) processing. The image processing unit 24 also performs predetermined computation processing by using the captured image data and performs TTL auto white balance (AWB) processing based on the obtained computation result.

The data output by the A/D converter 23 is directly written in the memory 32 via the image processing unit 24 and the memory control unit 15 or via the memory control unit 15. The memory 32 stores image data obtained by the imaging unit 22 and converted into digital data by the A/D converter 23 and image data to be displayed on a display unit 28 serving as display means. The memory 32 has a sufficient storage capacity for storing a predetermined number of still images or a predetermined time of video or audio data.

The memory 32 also serves as a memory for image display (a video memory). A digital/analog (D/A) converter 19 converts data for image display stored in the memory 32 into an analog signal and supplies the analog signal to the display unit 28. In this way, the image data for display written in the memory 32 is displayed on the display unit 28 via the D/A converter 19. The display unit 28 displays an image in accordance with the analog signal output by the D/A converter 19 on a display device such as a liquid crystal display (LCD). A digital signal obtained by A/D-conversion by the A/D converter 23 and accumulated in the memory 32 is D/A-converted by the D/A converter 19. Next, the obtained analog signal is sequentially transferred to the display unit 28 to be displayed. In this way, the display unit 28 functions as an electronic viewfinder and performs through-the-lens image display (live view display). The display unit 28 may be provided with an electronic viewfinder having an eyepiece unit (not illustrated) into which the user looks or with a display on the rear side of the digital camera 100. The display unit 28 may be provided with both the electronic viewfinder and the rear-side display.

A non-volatile memory 56 is electrically erasable and recordable memory. For example, an electrically erasable programmable read-only memory (EEPROM) or the like is used. The non-volatile memory 56 stores constants for operations of the system control unit 50, a program, etc. The term "program" used herein refers to a program for executing various flowcharts which will be described below in the present exemplary embodiment.

The system control unit 50 controls the entire digital camera 100. The system control unit 50 includes a line-of-sight display unit, a line-of-sight state determination unit, a line-of-sight information determination unit, a subject detection unit, and a line-of-sight acquisition possibility determination unit. The system control unit 50 executes the program recorded in the non-volatile memory 56 described above to realize individual processing according to the present exemplary embodiment, which will be described below. A random access memory (RAM) is used as a system memory 52. Constants for operations of the system control unit 50, variables, a program read from the non-volatile memory 56, and the like are loaded into the system memory 52. The system control unit 50 also performs display control processing by controlling the memory 32, the D/A converter 19, the display unit 28, and the like. The display unit 28 includes an electronic viewfinder (EVF) into which the user looks, a thin-film transistor (TFT) liquid crystal display into which the user does not look but which enables a touch operation or the like. The system memory control unit 50 also performs display control processing by controlling the display unit 28 based on information obtained by an eye sensor of the EVF of the display unit 28, the information indicating whether an eye of the user is close to or away from the EVF.

A system timer 53 is a time measurement unit that measures time needed for various controls and time of a built-in clock.

A power supply switch 72 is an operation member for switching ON/OFF of the power of the digital camera 100.

A mode selection switch 60, a first shutter switch 62, a second shutter switch 64, and an operation unit 70 are operation members for inputting various kinds of operational instructions to the system control unit 50.

A line-of-sight acquisition unit and a line-of-sight confirmation unit are included in the operation unit 70.

The mode selection switch 60 switches an operation mode of the system control unit 50 to any one of a still image recording mode, a video shooting mode, a reproduction mode, etc. The still image recording mode includes an auto shooting mode, an auto scene determination mode, a manual mode, an aperture priority mode (Av mode), and a shutter speed priority mode (Tv mode). There are also various kinds of scene modes, which are scene-specific shooting settings, a program AE mode, a custom mode, etc. The mode selection switch 60 directly switches the mode to any one of these modes included in menu buttons. Alternatively, after switching to the menu buttons by using the mode selection switch 60, the mode may be switched to any one of these modes included in the menu buttons by using another operation member. Similarly, the video shooting mode may include a plurality of modes.

The first shutter switch 62 is turned on when the photographer presses a shutter button 61 of the digital camera 100 halfway down, which is so-called half press (a capturing preparation instruction), and generates a first shutter switch signal SW1. The first shutter switch signal SW1 starts an operation such as auto focus (AF) processing, auto exposure (AE) processing, auto white balance (AWB) processing, and flash preliminary emission (EF) processing.

The second shutter switch 64 is turned on when the photographer fully presses the shutter button 61, which is so-called full press (a capturing instruction), and generates a second shutter switch signal SW2. When the second shutter switch signal SW2 is turned on, the system control unit 50 starts a series of image capturing processing from reading of a signal from the imaging unit 22 to writing of image data in a recording medium 200.

Each operation member of the operation unit 70 is assigned a function as appropriate for an individual scene by selecting a function icon from various function icons displayed on the display unit 28 and serves as a corresponding one of various function buttons. Examples of the function buttons include an end button, a return button, an image forwarding button, a jump button, a narrow-down button, and an attribute change button. For example, when a menu button is pressed, a menu screen on which various settings can be made is displayed on the display unit 28. The user can intuitively perform various kinds of settings by using the menu screen displayed on the display unit 28, four-direction buttons of up, down, left, and right, and a SET button.

The operation unit 70 includes various kinds of operation members serving as an input unit for receiving operations from the user.

The operation unit 70 includes an electronic button, a cross key, and the like for performing menu selection, mode selection, and reproduction of a captured video, for example.

A power supply control unit 80 includes a battery detection circuit, a DC-DC converter, a switch circuit for switching blocks to be energized, and the like, and detects attachment and removal of a battery, the kind of the battery, and the remaining amount of the battery. The power supply control unit 80 controls the DC-DC converter based on the detection result and an instruction from the system control unit 50 and supplies a necessary voltage for a necessary period to each unit including the recording medium 200.

A power supply unit 30 includes a primary battery such as an alkaline battery or a lithium battery, a secondary battery such as a nickel-cadmium (NiCd) battery, a nickel metal hydride (NiMH) battery, or a lithium ion (Li) battery, or an alternating current (AC) adapter. A recording medium interface (I/F) 18 is an interface with the recording medium 200 such as a memory card or a hard disk. The recording medium 200 is a recording medium such as a memory card for recording a captured image and includes a semiconductor memory, a magnetic disk, or the like.

A communication unit 54 is connected wirelessly or via a wire cable and transmits and receives video signals and audio signals. The communication unit 54 can also be connected to a wireless local area network (LAN) or the Internet. The communication unit 54 can transmit an image (including a through-the-lens image) captured by the imaging unit 22 and an image recorded in the recording medium 200 and can receive image data and other various kinds of information from an external apparatus.

An orientation detection unit 55 detects orientation of the digital camera 100 with respect to the direction of gravity. Based on the orientation detected by the orientation detection unit 55, it is possible to determine whether the image captured by the imaging unit 22 is an image captured by the digital camera 100 horizontally held or an image captured by the digital camera 100 vertically held. The system control unit 50 can add direction information corresponding to the orientation detected by the orientation detection unit 55 to an image file of an image captured by the image capturing unit 22 or can rotate and record the image. An acceleration sensor, a gyro sensor, or the like can be used as the orientation detection unit 55.

[Configuration of Line-of-Sight Detection]

Figure 4:
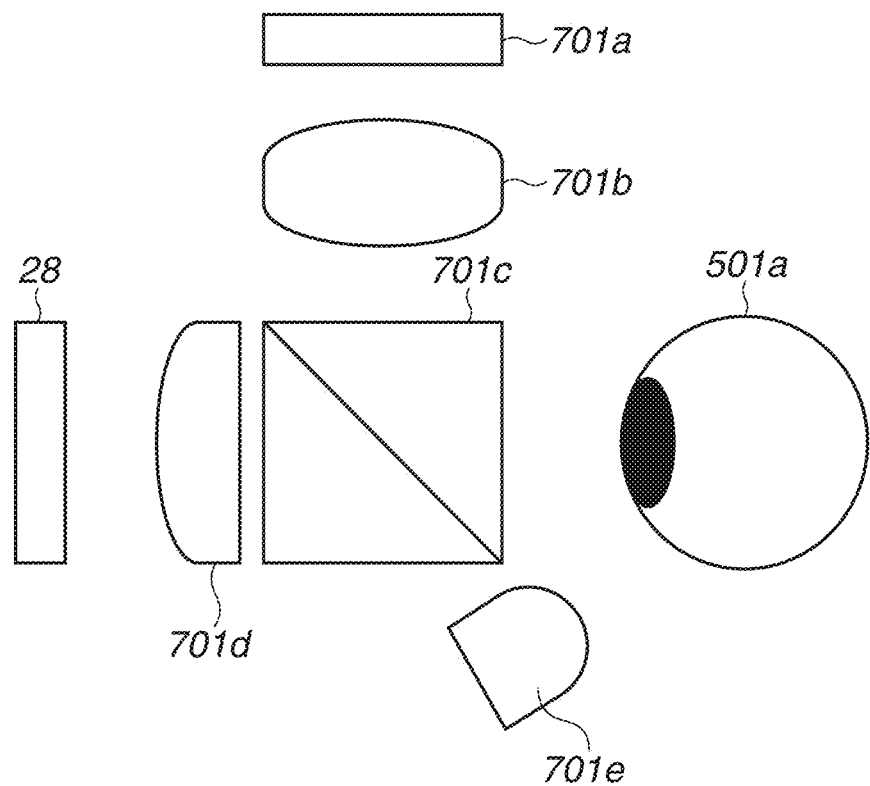
FIG. 4 illustrates an example of a configuration of a line-of-sight input operation unit according to the first exemplary embodiment.

In the present exemplary embodiment, a line-of-sight input operation unit 701 is provided as one operation member of the operation unit 70. The line-of-sight input operation unit 701 is the line-of-sight acquisition unit, which is an operation member for detecting the portion of the display unit 28 to which the line of sight of the user is directed. FIG. 4 illustrates an example of the line-of-sight input operation unit 701.

FIG. 4 illustrates a configuration that realizes a method discussed in Japanese Patent Application Laid-Open No. 2020-119093. In this method, a rotation angle of an optical axis of an eyeball 501a of the user who looks into a finder visual field is detected, and the line of sight of the user is detected from the detected rotation angle. A live view display image captured through a lens unit 100 is displayed on the display unit 28. FIG. 4 illustrates an image sensor 701a, a light receiving lens 701b, a dichroic mirror 701c, an eyepiece lens 701d, and an illumination light source 701e. The illumination light source 701e projects infrared light onto the eyeball 501a. The infrared light reflected by the eyeball 501a is reflected by the dichroic mirror 701c and is captured by the image sensor 701a. The captured eyeball image is converted into a digital signal by an A/D converter (not illustrated) and is transmitted to the system control unit 50. The system control unit 50 serving as the line-of-sight acquisition unit extracts a pupil area or the like from the captured eyeball image and calculates the line of sight of the user.

Figure 5:
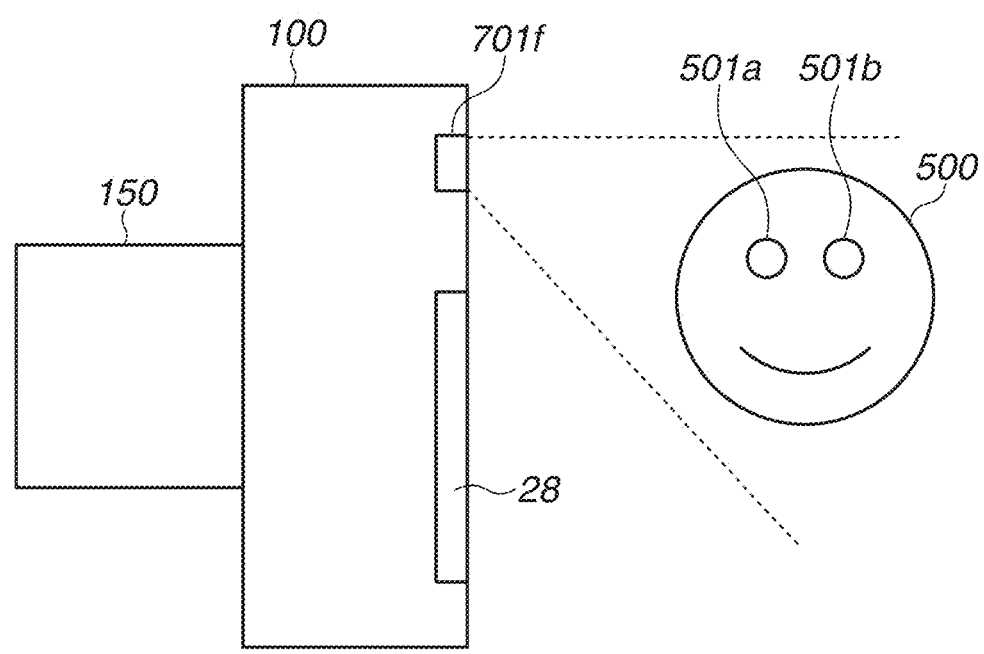
FIG. 5 illustrates another example of the configuration of the line-of-sight input operation unit according to the first exemplary embodiment.

The line-of-sight input operation unit 701 is not limited to the above-described method, and a method in which both eyes of the user are captured to detect the line of sight may be used. FIG. 5 illustrates an example of the line-of-sight input operation unit 701 different from that illustrated in FIG. 4.

In FIG. 5, a live view image captured through the lens unit 100 is displayed on the display unit 28 provided on the rear surface of the digital camera 100. In FIG. 5, a camera 701f that captures a face 500 of the user who is observing the display unit 28 is provided on the rear surface of the camera 100. In FIG. 5, an angle of a view captured by the camera 701f is indicated by a dotted line. An illumination light source 701e (not illustrated) projects light onto the face of the user, and an eyeball image is captured by the camera 701f. In this way, the line of sight of the user is calculated. The line-of-sight input operation unit 701 is not limited to the method, and any configuration that can detect the portion of the display unit 28 at which the user stares may be used.

[Line-of-Sight Detection Processing]

A line-of-sight detection processing method and a display method based on line-of-sight position state determination and a result of the line-of-sight position state determination according to the first exemplary embodiment will be described with reference to FIGS. 6, 7, and 8A to 8C.

Figure 6:
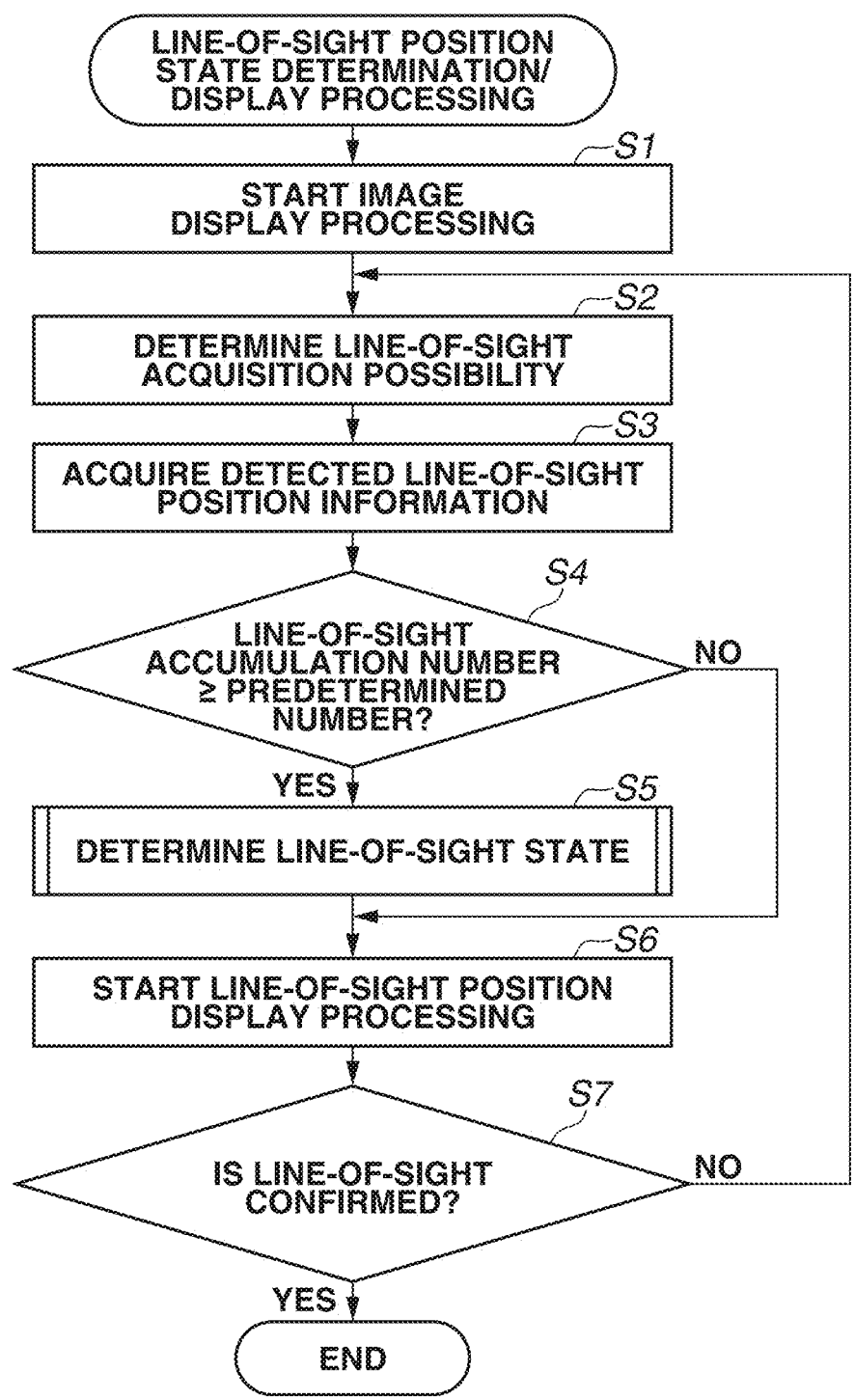
FIG. 6 is a main flowchart illustrating a line-of-sight detection processing method of an electronic apparatus, line-of-sight position state determination, and a determination result according to the first exemplary embodiment.

FIG. 6 is a main flowchart illustrating the line-of-sight detection processing method of the electronic apparatus, the line-of-sight position state determination, and the determination result according to the first exemplary embodiment. FIG. 6 illustrates an operation in a case where the user performs a line-of-sight confirmation operation while viewing an image displayed on the display unit 28 serving as display means. The operation is realized mainly by the system control unit 50. While the present exemplary embodiment will be described with reference to the block diagram of the imaging apparatus in FIG. 1, a similar operation can be performed by an electronic apparatus including at least the system control unit 50, the display unit 28, and the operation unit 70.

In step S1, the system control unit 50 displays image data on the display unit 28. The image for display is, for example, a reduced image that matches the resolution of the display unit 28. The system control unit 50 displays the image at a predetermined frame rate, and the user can check the displayed image through the display unit 28.

In step S2, the system control unit 50 causes the line-of-sight acquisition possibility determination unit to determine whether line-of-sight information can be acquired by the line-of-sight acquisition possibility determination unit. In a case where the EVF included in the display unit 28 has an eye sensor, the system control unit 50 determines whether the line-of-sight information can be acquired based on information indicating whether the user's eye is close to the EVF or away from the EVE. When the user looks into the EVF, the eve sensor detects that the user is in an eye-contact state, and the system control unit 50 determines that the line-of-sight input operation unit 701 serving as line-of-sight acquisition means can acquire line-of-sight information. In contrast, when the user does not look into the EVF, the eye sensor detects that the user is not in an eye-contact state, and the system control unit 50 determines that the line-of-sight input operation unit 701 serving as the line-of-sight acquisition unit cannot acquire line-of-sight information. Also, with a TFT liquid crystal display included in the display unit 28, the system control unit 50 determines whether line-of-sight information can be acquired by the line-of-sight input operation unit 701.

In step S2, in a case where the system control unit 50 determines that the line-of-sight information can be acquired, the processing proceeds to step S3 In step S3, the system control unit 50 starts line-of-sight detection. From step S4, the line-of-sight input operation unit 701 acquires and accumulates information indicating which position (line-of-sight position) on the display unit 28 is observed by the user, at predetermined time intervals in association with the display image observed by the user. In step S2, in a case where the system control unit 50 determines that the line-of-sight information cannot be acquired, the line-of-sight input operation unit 701 does not acquire and accumulate the line-of-sight information at the timing of the determination.

In step S4, the system control unit 50 determines whether the number of line-of-sight information acquisition and accumulation operations performed in step S3 is equal to or more than a predetermined number N. The predetermined number N is determined based on the number of line-of-sight information items acquired and accumulated to enable line-of-sight state determination performed in the subsequent step S5.

In step S2, in a case where the system control unit 50 determines that the line-of-sight information cannot be acquired, because the line-of-sight information is not acquired or accumulated, the line-of-sight accumulation number is not incremented and compared with the predetermined number N. In a case where the system control unit 50 determines that the number of line-of-sight information items acquired and accumulated in step S3 is equal to or more than the predetermined number N (YES in step S4), the line-of-sight state determination in step S5, which is performed by the line-of-sight state determination unit, is possible. Thus, the processing proceeds to step S5. In a case where the system control unit 50 determines that the number of line-of-sight information items acquired and accumulated in step S3 is less than the predetermined number N (NO in step S4), the line-of-sight state determination in step S5, which is performed by the line-of-sight state determination unit, is impossible. Thus, the processing proceeds to step S6, skipping step S5.

In step S5, the system control unit 50 performs the line-of-sight state determination, which is performed by the line-of-sight state determination imit. The processing will be described in detail below.

In step S6, by using the line-of-sight position information acquired in step S3 or S5, the system control unit 50 causes the display unit 28 to display the line-of-sight position. In step S4, in a case where the system control unit 50 determines that the line-of-sight accumulation number is equal to or greater than the predetermined number N (YES in step S4), the line-of-sight position acquired in step S5 is used. In step S4, in a case where the system control unit 50 determines that the line-of-sight accumulation number is smaller than the predetermined number N (NO in step S4), the line-of-sight position acquired in step S3 is used.

In step S7, the system control unit 50 determines whether the line-of-sight confirmation operation has been performed by the user. In a case where the line-of-sight confirmation operation has been performed by the user (YES in step S7), the system control unit 50 stationarily displays the line-of-sight position on the display unit 28 and ends the line-of-sight position state determination and the display processing. The display of the line-of-sight position may be maintained on the display unit 28, The display method may be changed. In a case where the line-of-sight confirmation operation has not been performed by the user (NO in step S7), the processing returns to step S2, in which the line-of-sight information acquisition possibility is determined by the line-of-sight acquisition possibility determination unit, and new line-of-sight information is acquired. In step S7, in a case where the line-of-sight confirmation operation has been performed (YES in step S7), the system control unit 50 resets the number of line-of-sight information acquisition and accumulation operations performed in step S3 and line-of-sight position shift information $\Delta S_j$.

[Line-of-Sight Position State Determination]

Figure 7:
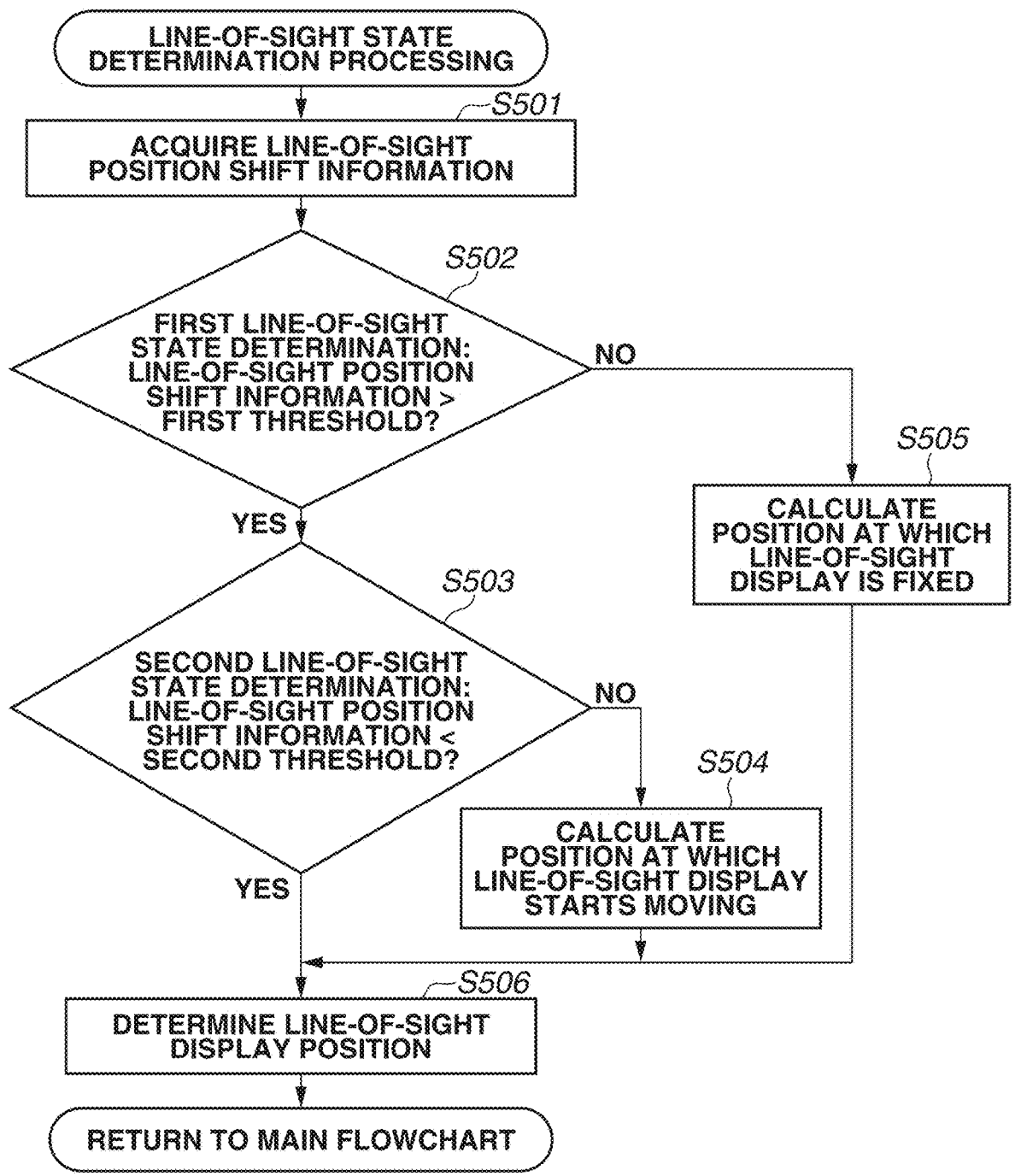
FIG. 7 is a flowchart illustrating line-of-sight detection processing according to the first exemplary embodiment.

The line-of-sight state determination in step S5 will be described with reference to a sub-flowchart in FIG. 7. A series of operations in the sub-flowchart is also realized mainly by the system control unit 50.

In step S501, the system control unit 50 acquires line-of-sight position shift information $\Delta S_j$ by using line-of-sight position information $S_j$ acquired in step S3 in FIG. 6. The line-of-sight position information $S_i$ has been determined to be equal to or more than the predetermined number N in step S4 in FIG. 6. The line-of-sight position shift information $\Delta S_j$ includes a horizontal position shift amount $\Delta S_{jH}$, a vertical position shift amount $\Delta S_{jV}$, and a position shift amount $\Delta S_{jr}$ between two points, which are calculated by the following equations (1), (2), and (3), respectively.

$$S_i = \{x_i, y_i\}$$

$$\Delta S_{jH} = x_{j+1} - x_j (j=1 \text{ to } N-1) \quad (1)$$

$$\Delta S_{jV} = y_{j+1} - y_j (j=1 \text{ to } N-1) \quad (2)$$

$$\Delta S_{jr} = \sqrt{(x_{j+1}-x_j)^2 + (y_{j+1}-y_j)^2} (j=1 \sim N-1) \quad (3)$$

In step S502, the system control unit 50 determines the line-of-sight position shift information $\Delta S_j$ acquired in step S501 by using a first determination number $N_1$ and a first threshold $Th_1$. The predetermined number N and the determinations number $JN_1$ have the following relationship (4).

$$N \geq JN_1 \quad (4)$$

In the present exemplary embodiment, $JN_1$ will be described as a fixed value of 5. The value of $JN_1$ may be changed in accordance with conditions. In step S502, in a case where the system control unit 50 determines that the line-of-sight position shift information $\Delta S_j$ corresponding to the first determination number $JN_1$ acquired in step S501 has been smaller than the first threshold $Th_1$ since a determination time (YES in step S502), the processing proceeds to step S505. In step S505, a position at which the line-of-sight position is fixed to be stationarily displayed (maintain a stationary state) on the display unit 28 is calculated. In a case where the system control unit 50 determines that any of the line-of-sight position shift information $\Delta S_j$ corresponding to the first determination number $JN_1$ acquired in step S501 has reached the first threshold $Th_1$ or more since the determination time (NO in step S502), the processing proceeds to step S503. In step S503, the line-of-sight position shift information $\Delta S_j$ is determined based on a second threshold.

In step S503, the system control unit 50 determines the line-of-sight position shift information $\Delta S_j$ acquired in step S501 by using a second determination number $JN_2$ and a second threshold $Th_2$. The predetermined number N and the determination number $JN_2$ have the following relationship (5).

$$N \geq JN_2 \quad (5)$$

In the present exemplary embodiment, $JN_2$ will be described as a fixed value of 5. The value of $JN_2$ may be changed in accordance with conditions. In step S503, in a case where the system control unit 50 determines that the line-of-sight position shift information $\Delta S_j$ corresponding to the second determination number $JN_2$ acquired in step S501 has been greater than the second threshold $Th_2$ since a determination time (YES in step S503), the processing proceeds to step S504. In step S504, a position at which the line-of-sight position starts moving to be dynamically (movably) displayed on the display unit 28 is calculated. In a case where the system control unit 50 determines that any of the line-of-sight position shift information $\Delta S_j$ corresponding to the second determination number $JN_2$ acquired in step S501 has reached the second threshold $Th_z$ or less since the determination time (NO in step S503), the same display as the previous display is maintained. Thus, the processing proceeds to step S506, and the line-of-sight display position to be displayed on the display unit 28 is determined by using the line-of-sight position information $S_i$ acquired in step S3.

Step S504 is performed in a case where the system control unit 50 determines that the line-of-sight position shift information $\Delta S_j$ is greater than the second threshold $Th_2$ in step S503. In step S504, the position to start dynamical display of the line-of-sight is calculated, and the processing proceeds to step S506.

Step S505 is performed in a case where the system control unit 50 determines that the line-of-sight position shift information $\Delta S_j$ is smaller than the first threshold $Th_1$ in step S502. In step S505, the position to start stationary display of the line-of-sight is calculated, and the processing proceeds to step S506. When the series of processes is completed, the processing returns to step S6 in the main flowchart in FIG. 6.

In step S506, the line-of-sight display position is determined.

[Determination on Whether to Fix Display Position and Calculation of Display Position]

The determination method for stationarily displaying the line-of-sight position performed in step S502 and the calculation of a fixed position of the display will be described with reference to FIGS. 8A to 8C and 9A to 9C. FIGS. 8A to 8C illustrate an example in which a captured video or a video being captured is displayed on the display unit 28 and the user performs a line-of-sight confirmation operation on a specific subject with his or her line of sight. A stationary display method used for the line-of-sight information display by using the first determination number $JN_1$ and the first threshold $Th_1$ will be described with reference to FIGS. 8A to 8C. FIGS. 8A to 8C illustrate excerpts of images displayed on the display unit 28 at the moments of time $t_1$ (FIG. 8A), time $t_2$ (FIG. 8B), and time $t_3$ (FIG. 8C) from the left. FIGS. 8A to 8C illustrate line-of-sight information display Sm and a subject Trg that the line of sight of the user is following.

FIG. 8A illustrates the moment when the subject Trg riding a bicycle has moved from the left to right on the screen. The user recognizes the subject Trg and starts to focus his or her line of sight on the subject Trg. At this moment, the line-of-sight information display Sm does not match with the subject Trg, and the line-of-sight information display Sm varies as indicated by broken lines.

FIG. 8B illustrates the moment when the subject Trg slows down the bicycle to stop. FIG. 8B illustrates the subject Trg and the line-of-sight information display Sm at the time $t_2$ after a lapse of time from the time $t_1$ in FIG. 8A. At this moment, the line-of-sight information display Sm starts to approximately match the subject Trg. The line-of-sight information display Sm varies as indicated by broken lines.

Figure 9A:
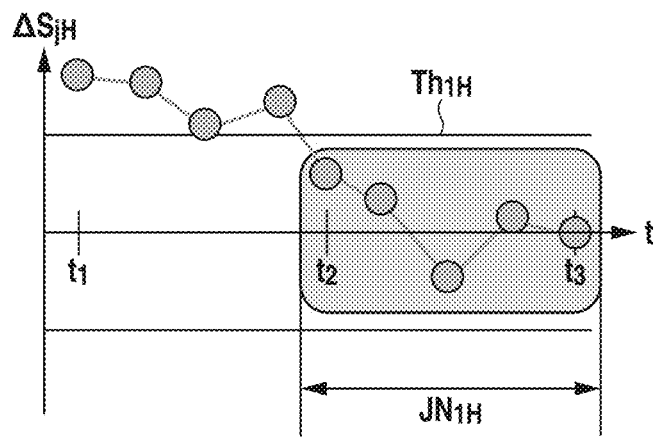
FIGS. 9A to 9C illustrate stationary display determination according to the first exemplary embodiment.
Figure 9B:
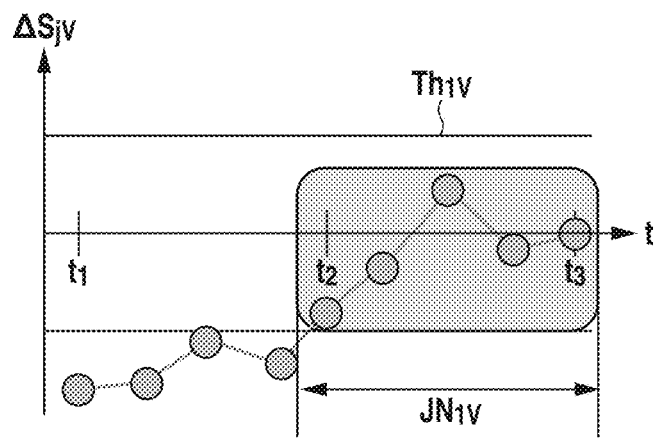
Figure 9C:
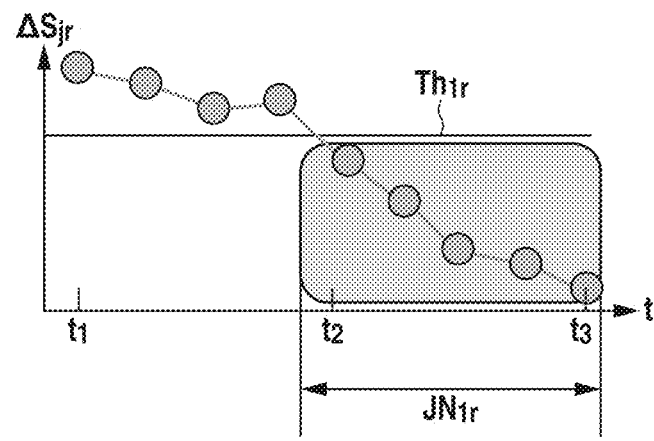

FIG. 8C illustrates the moment when the subject Trg has stopped the bicycle and stands still. FIG. 8C illustrates the subject Trg and the line-of-sight information display Sm at the time $t_3$ after a lapse of time from the time $t_2$ in FIG. 8B. At this moment, the line-of-sight information display Sm matches the subject Trg, and the line-of-sight information display Sm is stationarily displayed by using the first determination number $JN_1$ and the first threshold $Th_1$. The processing illustrated in FIGS. 8A to 8C will be described by using line-of-sight position shift information $\Delta S_j$, the first determination number $JN_1$, and the first threshold $Th_1$ in FIGS. 9A to 9C. FIGS. 9A to 9C illustrate stationary display determination using the first determination number $JN_1$ and the first threshold $Th_1$. In FIGS. 9A to 9C, the first determination number $JN_1$ is set to 5. The first determination number $JN_1$ is not limited to the number 5 and may be changed in accordance with the line-of-sight characteristics of the user, the viewing state of the display unit 28, or a manual operation by the user.

FIG. 9A illustrates a horizontal position shift amount $\Delta S_{jH}$ included in the line-of-sight position shift information $\Delta S_j$ at time t. Two solid lines drawn horizontally represent a threshold $Th_{1H}$ for the horizontal position shift amount included in the first threshold $Th_1$. A gray-hatched portion represents a determination number $JN_{1H}$ for the horizontal position shift amount included in the first determination number $JN_1$.

FIG. 9B illustrates a vertical position shift amount $\Delta S_{jV}$ included in the line-of-sight position shift information $\Delta S_j$ at time t. Two solid lines drawn horizontally represent a threshold $Th_{1V}$ for the vertical position shift amount included in the first threshold $Th_1$. A gray-hatched portion represents a determination number $JN_{1V}$ for the vertical position shift amount included in the first determination number $JN_1$.

FIG. 9C illustrates a position shift amount $\Delta S_{jr}$ between two points included in the line-of-sight position shift information $\Delta S_j$ at time t. One solid line drawn horizontally represents a threshold $Th_{1r}$ for the position shift amount between two points included in the first threshold $Th_1$. A gray-hatched portion represents a determination number $JN_{1r}$ for the position shift amount between two points included in the first determination number $JN_1$.

FIG. 9A illustrates a case where the stationary display determination of the line-of-sight information display is performed based on the line-of-sight position shift information $\Delta S_{jH}$ corresponding to the horizontal position shift amount. The line-of-sight position shift information $\Delta S_{jH}$ corresponding to the horizontal position shift amount from the time $t_1$ to the time t gradually decreases but still exceeds the threshold $Th_{1H}$ for the horizontal position shift amount. Thereafter, the line-of-sight position shift information $\Delta S_{jH}$ corresponding to the horizontal position shift amount from the time $t_2$ to the time $t_3$ transitions within the threshold $Th_{1H}$ for the horizontal position shift amount and converges with time, At this point, because the line-of-sight position shift information $\Delta S_{jH}$ corresponding to the horizontal position shift amount is within the threshold $Th_{1H}$ for the horizontal position shift amount after the time $t_2$, a count-up operation is performed. In the present exemplary embodiment, because the determination number $JN_{1H}$ for the horizontal position shift amount is set to 5, the line-of-sight information display on the display unit 28 is changed to be stationary as a fixed value from the time $t_3$, which is the fifth determination time. An average value of the horizontal position shift amounts corresponding to the determination number $JN_{1H}$ is used as the fixed value of the position of the displayed line-of-sight information. Alternatively, the horizontal position shift amount corresponding to the last determination number in the determination number $JN_{1H}$ may be used as the fixed value.

FIG. 9B illustrates a case where the stationary display determination of the line-of-sight information display is performed based on the line-of-sight position shift information $\Delta S_{jV}$ corresponding to the vertical position shift amount. The line-of-sight position shift information $\Delta S_{jV}$ corresponding to the vertical position shift amount from the time $t_1$ to the time $t_2$ gradually decreases but is still lower than the threshold $Th_{1V}$ for the vertical position shift amount. Thereafter, the line-of-sight position shift information $\Delta S_{jV}$ corresponding to the vertical position shift amount from the time $t_2$ to the time $t_3$ transitions within the threshold $Th_{1V}$ for the vertical position shift amount and converges with time. At this point, because the line-of-sight position shift information $\Delta S_{jV}$ corresponding to the vertical position shift amount is within the threshold $Th_{1V}$ for the vertical position shift amount after the time $t_2$, a count-up operation is performed. In the present exemplary embodiment, because the determination number $JN_{1V}$ for the vertical position shift amount is set to 5, the line-of-sight information display on the display unit 28 is changed to be stationary as a fixed value from the time $t_3$, which is the fifth determination time. An average value of the vertical position shift amounts corresponding to the determination number $JN_{1V}$ is used as the fixed value of the position of the displayed line-of-sight information. Alternatively, the vertical position shift amount corresponding to the last determination number in the determination number $JN_{1V}$ may be used as the fixed value.

FIG. 9C illustrates a case where the stationary display determination of the line-of-sight information display is performed based on the line-of-sight position shift information $\Delta S_{jr}$ corresponding to the position shift amount between two points. Unlike $\Delta S_{jH}$ and $\Delta S_{jV}$ described above, $\Delta S_{jr}$ takes a positive value. Thus, only a positive value is set as the threshold $Th_{1r}$ for the position shift amount between two points. The line-of-sight position shift information $\Delta S_{jr}$ corresponding to the position shift amount between two points from the time $t_1$ to the time $t_2$ gradually decreases but still exceeds the threshold $Th_{1r}$ for the position shift amount between two points. Thereafter, the line-of-sight position shift information $\Delta S_{jr}$ corresponding to the position shift amount between two points from the time $t_2$ to the time $t_3$ transitions within the threshold $Th_{1r}$ for the position shift amount between two points and converges with time. At this point, because the line-of-sight position shift information $\Delta S_{jr}$ corresponding to the position shift amount between two points is within the threshold $Th_{1r}$ for the position shift amount between two points after the time $t_2$, a count-up operation is performed. In the present exemplary embodiment, because the determination number $JN_{1r}$ for the position shift amount between two points is set to 5, the line-of-sight information display on the display unit 28 is changed to be stationary as a fixed value from the time $t_3$, which is the fifth determination time. An average value of the position shift amounts between two points corresponding to the determination number $JN_{1r}$ is used as the fixed value of the position of the displayed line-of-sight information. Alternatively, the position shift amount between two points corresponding to the last determination number in the determination number $JN_{1r}$ may be used as the fixed value.

As described above, by stationarily displaying the line-of-sight information display in accordance with a change in the line-of-sight information, it is possible to provide an electronic apparatus that improves display quality and convenience.

[Determination of Whether to Shift Display Position and Calculation of Display Position]

The determination method for stationarily displaying the line-of-sight position performed in step S503 and the calculation of a fixed position of the display will be described with reference to FIGS. 10A to 10C and 11A to 11C. FIGS. 10A to 10C illustrate an example in which a captured video or a video being captured is displayed on the display unit 28 and the user performs a line-of-sight confirmation operation on a specific subject with his or her line of sight. A stationary display method performed on the line-of-sight information display by using the second determination number $JN_2$ and the second threshold $Th_2$ will be described with reference to FIGS. 10A to 10C. FIGS. 10A to 10C illustrate excerpts of images displayed on the display unit 28 at the moments of time $t_1'$ (FIG. 10A), time $t_2'$ (FIG. 10B), and time $t_3'$ (FIG. 10C) from the left. As in FIGS. 8A to 8C, FIGS. 10A to 10C illustrates the line-of-sight information display Sm and a subject Trg' that the user is following with the line of sight. The subject is different from that in FIGS. 8A to 8C.

FIG. 10A illustrates the moment when the automobile Trg', which is the subject, is about to move from the left to right on the screen. The user continuously recognizes the automobile Trg', and the line of sight of the user matches the automobile Trg'. At this moment, the line-of-sight information display Sm matches the automobile Trg', and the line-of-sight information display Sm is stationary by the processing in step S502 described above. The line-of-sight information display Sm may be moving before the processing in step S502 is performed.

FIG. 10B illustrates the moment when the subject Trg' starts moving and increases the speed. FIG. 10B illustrates the subject Trg' and the line-of-sight information display Sm at the time $t_2'$ after a lapse of time from the time $t_1'$ in FIG. 10A. At this moment, the line-of-sight information display Sm starts to deviate from the subject Trg'. The line-of-sight information display Sm is, however, stationary by the processing in step S502 described above. The line-of-sight information display Sm may be moving before the processing in step S502 is performed.

FIG. 10C illustrates the moment when the automobile, which is the subject Trg', is stopped. FIG. 10C illustrates the subject Trg' and the line-of-sight information display Sm at the time $t_3'$ after a lapse of time from the time $t_2'$ in FIG. 10B. At this moment, the line-of-sight information display Sm does not match the subject Trg' and is dynamically displayed by using the second determination number $JN_2$ and the second threshold $Th_2$. Thus, the line-of-sight information display Sm is displayed in a varying manner as indicated by broken lines.

Figure 11A:
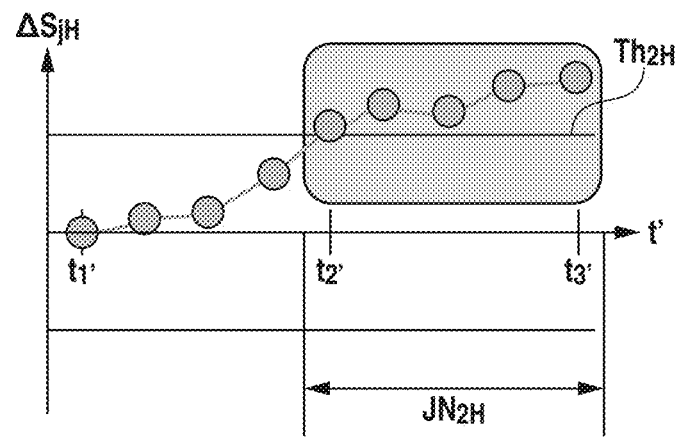
FIGS. 11A to 11C illustrate dynamical display determination according to the first exemplary embodiment.
Figure 11B:
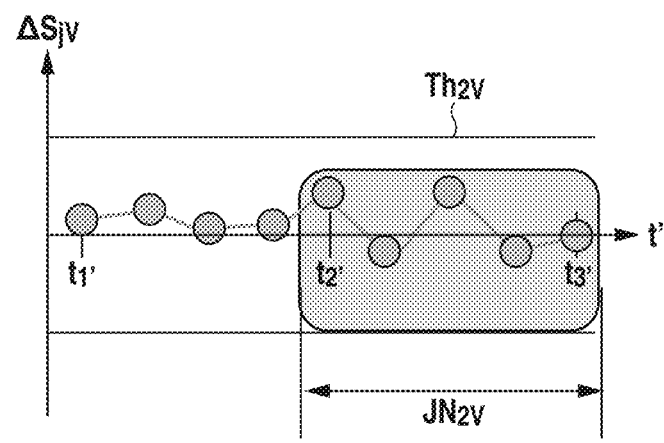
Figure 11C:
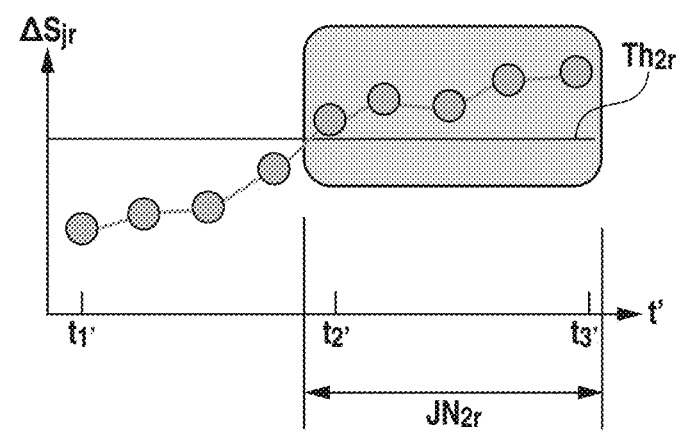

The sequence of the operations illustrated in FIGS. 10A to 10C will be described by using line-of-sight position shift information $\Delta S_j$, the second determination number $JN_2$, and the second threshold $Th_2$ in FIGS. 11A to 11C. FIGS. 11A to 11C illustrate stationary display determination using the second determination number $JN_2$ and the second threshold $Th_2$ according to the present exemplary embodiment. In FIGS. 11A to 11C, the second determination number $JN_2$ is set to 5. The second determination number $JN_2$ is not limited to the number and may be changed in accordance with the line-of-sight characteristics of the user, the viewing state of the display unit 28, or a manual operation by the user.

FIG. 11A illustrates a horizontal position shift amount $\Delta S_{jH}$ included in the line-of-sight position shift information $\Delta S_j$ at time t'. Two solid lines drawn horizontally represent a threshold $Th_{2H}$ for the horizontal position shift amount included in the second threshold $Th_2$. A gray-hatched portion represents a determination number $JN_{2H}$ for the horizontal position shift amount included in the second determination number $JN_2$, FIG. 11B illustrates a vertical position shift amount $\Delta S_{jV}$ included in the line-of-sight position shift information $\Delta S_j$ at the time t'. Two solid lines drawn horizontally represent a threshold $Th_2$ for the vertical position shift amount included in the second threshold $Th_2$. A gray-hatched portion represents a determination number $JN_{2V}$ for the vertical position shift amount included in the second determination number $JN_2$.

FIG. 9C illustrates a position shift amount $\Delta S_{jr}$ between two points included in the line-of-sight position shift information $\Delta S_j$ at the time t'. One solid line drawn horizontally represents a threshold $Th_{2r}$ for the position shift amount between two points included in the second threshold $Th_2$. A gray-hatched portion represents a determination number $JN_2$ for the position shift amount between two points included in the second determination number $JN_2$.

FIG. 11A illustrates a case where the dynamical display determination of the line-of-sight information display is performed based on the line-of-sight position shift information $\Delta S_{jH}$ corresponding to the horizontal position shift amount. The line-of-sight position shift information $\Delta S_{jH}$ corresponding to the horizontal position shift amount from the time $t_1'$ to the time $t_2'$ gradually increases and is about to exceed the threshold $Th_{1H}$ for the horizontal position shift amount. Thereafter, the line-of-sight position shift information $\Delta S_j$ corresponding to the horizontal position shift amount from the time $t_2'$ to the time $t_3'$ transitions over the threshold Than for the horizontal position shift amount and shifts along with the subject Trg' with time. At this point, because the line-of-sight position shift information $\Delta S_{jH}$ corresponding to the horizontal position shift amount is over the threshold $Th_{2H}$ for the horizontal position shift amount after the time $t_2'$, a count-up operation is performed. In the present exemplary embodiment, because the determination number $JN_{2H}$ for the horizontal position shift amount is set to 5, the line-of-sight information display on the display unit 28 is changed to be dynamical from the time $t_3'$, which is the fifth determination time. An average value of the horizontal position shift amounts corresponding to the determination number $JN_{2H}$ is used as the value for displaying the position of the line-of-sight information. Alternatively, the horizontal position shift amount corresponding to the last determination number in the determination number $JN_{2H}$ may be used as the fixed value. Even if the transition is within the threshold $Th_{21H}$ for the horizontal position shift amount, when the line-of-sight position shift information $\Delta S_{jH}$ corresponding to the horizontal position shift amount constantly shifts in the same direction successively for the determination number $JN_{2H}$ for the horizontal position shift amount, the following operation may be performed. That is, the line-of-sight information display may be changed to be dynamically displayed.

FIG. 11B illustrates a case where the dynamical display determination of the line-of-sight information display is performed based on the line-of-sight position shift information $\Delta S_{jV}$ corresponding to the vertical position shift amount. The line-of-sight position shift information $\Delta S_{jV}$ corresponding to the vertical position shift amount from the time t to the time $t_2'$ has approximately constant values and is constantly lower than the threshold $Th_{2V}$ for the vertical position shift amount. At this point, because the line-of-sight position shift information $\Delta S_{jV}$ corresponding to the vertical position shift amount is within the threshold $Th_{2V}$ for the vertical position shift amount after the time $t_2$, a count-up operation is not performed. Therefore, based on the line-of-sight position shift information $\Delta S_{jV}$ corresponding to the vertical position shift amount, the line-of-sight information display on the display unit 28 is determined to maintain its stationary display as a fixed value even at the time $t_3'$.

FIG. 1/ C illustrates a case where the dynamical display determination of the line-of-sight information display is performed based on the line-of-sight position shift information $\Delta S_{jr}$ corresponding to the position shift amount between two points. Unlike $\Delta_{jH}$ and $\Delta S_{jV}$ described above, $\Delta S_{jr}$ takes a positive value. Thus, only a positive value is set as the threshold $Th_{2r}$ for the position shift amount between two points. The line-of-sight position shift information $\Delta S_{jr}$ corresponding to the position shift amount between two points from the time $t_1'$ to the time $t_2'$ gradually increases but is still lower than the threshold $Th_{2r}$ for the position shift amount between two points. Thereafter, the line-of-sight position shift information $\Delta S_{jr}$ corresponding to the position shift amount between two points from the time $t_2'$ to the time $t_3'$ transitions over the threshold $Th_{2r}$ for the position shift amount between two points and changes with time. At this point, because the line-of-sight position shift information $\Delta S_{jr}$ corresponding to the position shift amount between two points is more than the threshold $Th_{2r}$ for the position shift amount between two points after the time $t_2'$, a count-up operation is performed. In the present exemplary embodiment, because the determination number $JN_{2r}$ for the position shift amount between two points is set to 5, the line-of-sight information display on the display unit 28 is changed to be dynamical as a fixed value from the time $t_3'$, which is the fifth determination time. An average value of the position shift amounts between two points corresponding to the determination number $JN_{2r}$ is used as the fixed value of the position of the displayed line-of-sight information. Alternatively, the position shift amount between two points corresponding to the last determination number in the determination number $JN_{2r}$ may be used as the fixed value.

As described above, by dynamically displaying the line-of-sight information display in accordance with a change in the line-of-sight information, it is possible to provide an electronic apparatus that improves display quality and convenience.

While the determination using the line-of-sight position shift amount $\Delta S_j$ has been described with reference to FIGS. 10A to 10C and 11A to 11C, stationary or dynamical display determination may be further performed based on whether the line-of-sight position shifts in a direction within a predetermined range. For example, a range of ±45 degrees can be selected as the predetermined range. In this way, it is possible to determine a state in which the line of sight varies and shifts.

As described above, by stationarily or dynamically displaying the line-of-sight position based on the line-of-sight position shift amount, it is possible to provide an electronic apparatus that improves display quality and convenience. In the present exemplary embodiment, the method for performing the stationary or dynamical display determination based on the line-of-sight position shift amount has been described. The determination, however, may be performed by using a change angle range of the line-of-sight position information, vector information, or the like. The determination may be performed by using not only the line-of-sight position information but also information such as gyro information of the electronic apparatus.

In the present exemplary embodiment, the same value is used as the first threshold $Th_1$ for the horizontal position, the vertical position, and the position between two points. The first threshold $Th_1$, however, may be changed to a different value. Alternatively, different values may be set for different positions.

Figure 12:
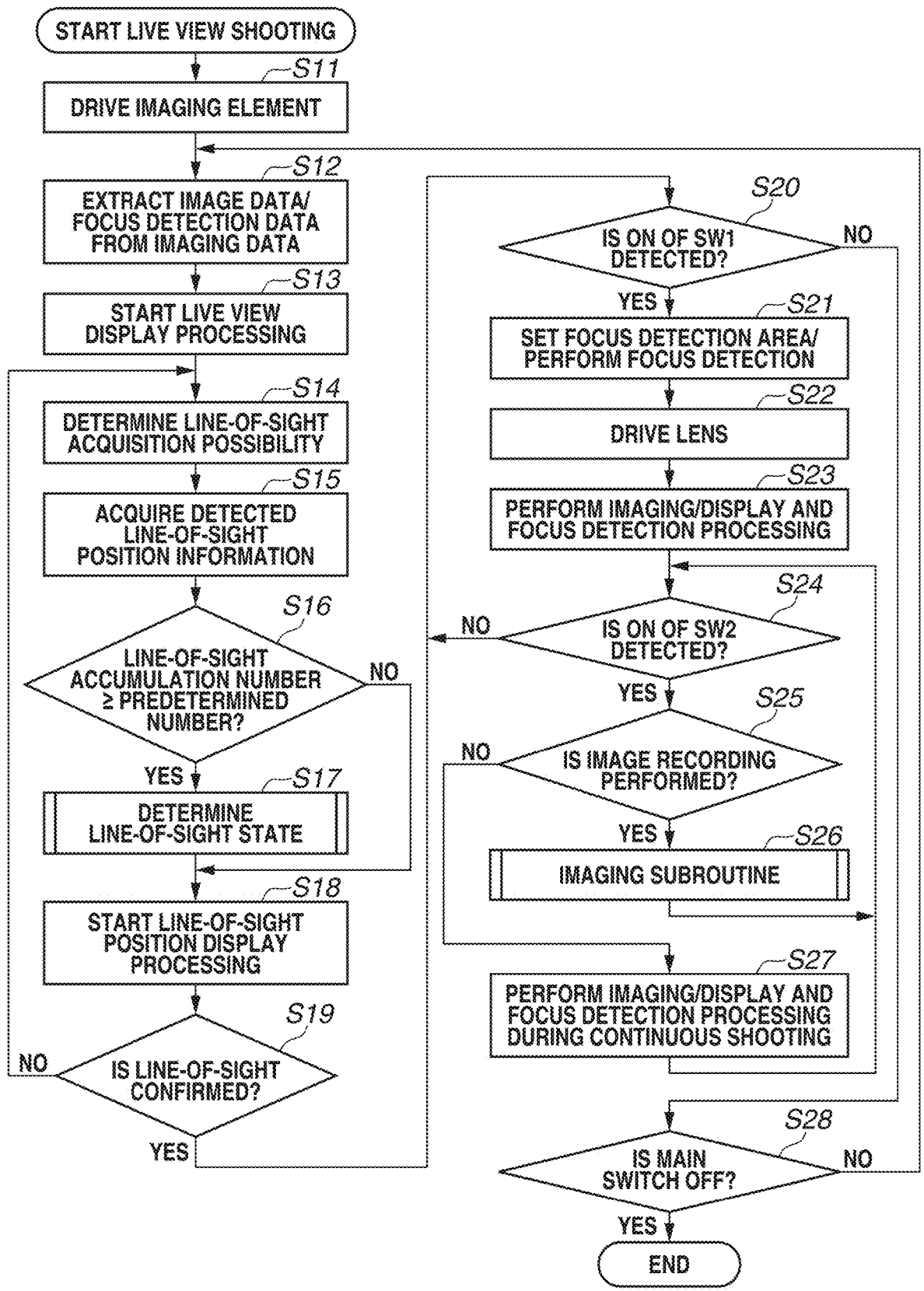
FIG. 12 is a flowchart illustrating focus determination, line-of-sight determination, and an imaging operation according to the second exemplary embodiment.
Figure 13:
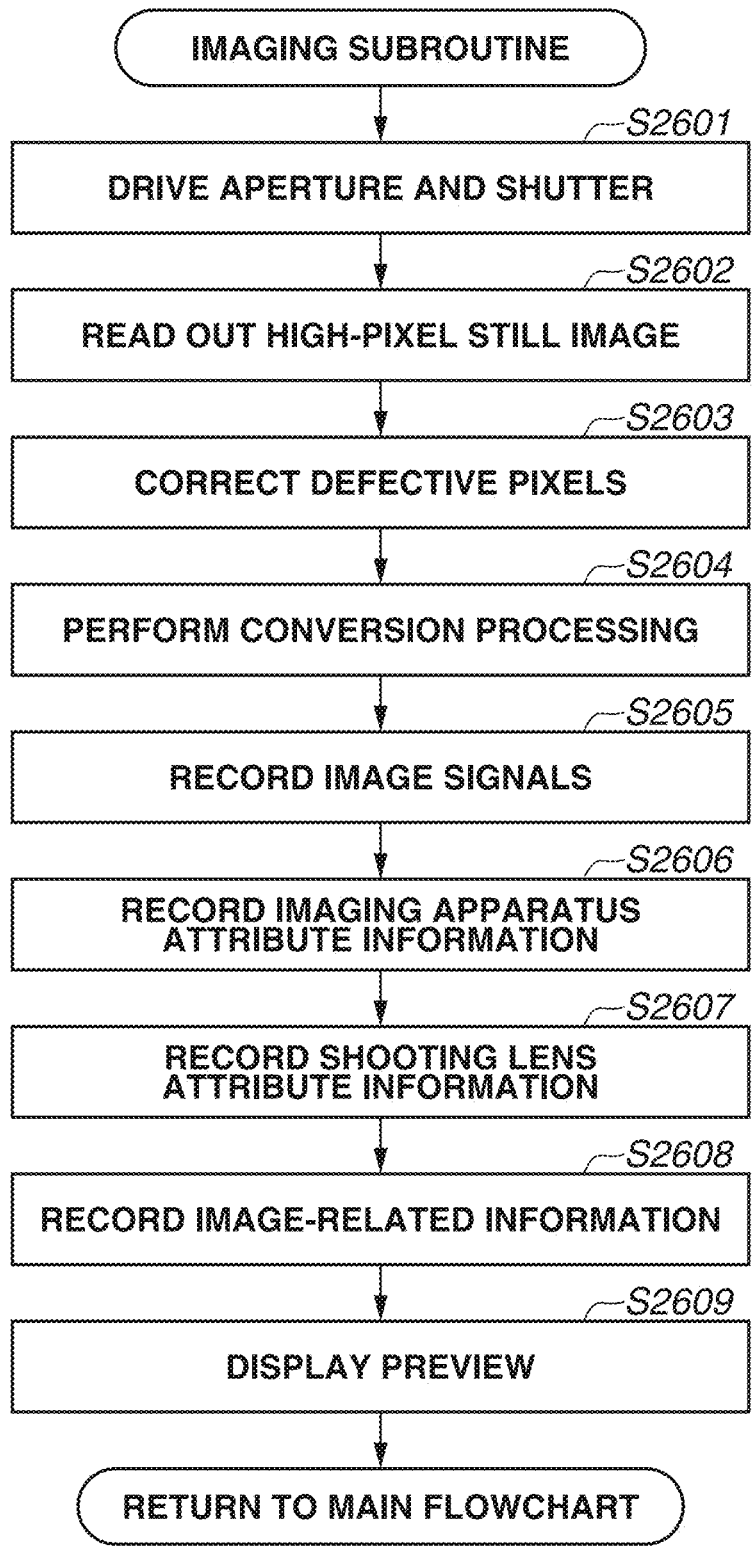
FIG. 13 is a flowchart illustrating an imaging subroutine according to the second exemplary embodiment.

A second exemplary embodiment will be described with reference to FIGS. 12 and 13. In the present exemplary embodiment, a line-of-sight position display method combined with a focus detection apparatus will be described.

[Description of Focus Detection Operation]

Figure 2:
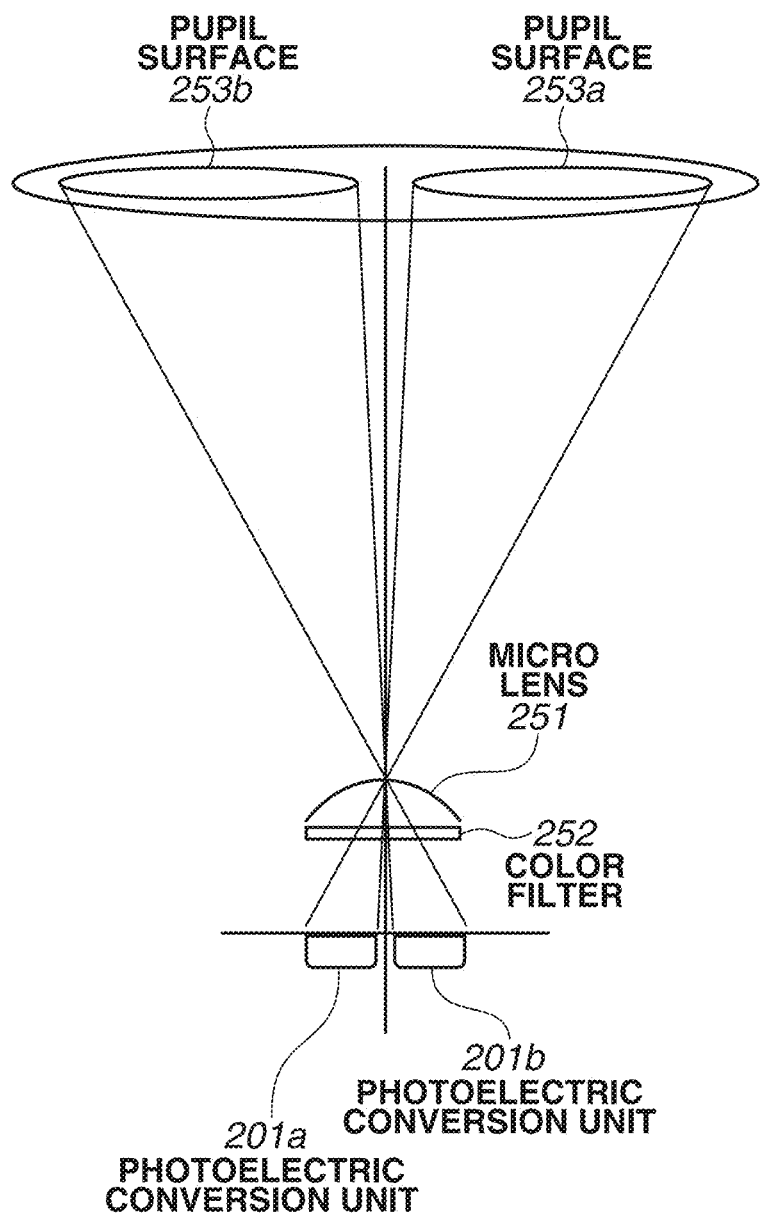
FIG. 2 illustrates a correspondence relationship between pupil surfaces and photoelectric conversion units of pixels of an imaging apparatus according to a second exemplary embodiment.

FIG. 2 illustrates a configuration of pixels and a correspondence relationship between pupil surfaces and photoelectric conversion units according to the present exemplary embodiment. FIG. 2 illustrates two photoelectric conversion units 201, pupil surfaces 253, a micro lens 251, and a color filter 252. In FIG. 2, a photoelectric conversion unit 201a (a first focus detection pixel) and a photoelectric conversion unit 20b (a second focus detection pixel) are provided as the two photoelectric conversion units 201. Light that passes through the pupil surface 253a enters the photoelectric conversion unit 201a. Light that passes through a pupil surface 253b enters the photoelectric conversion unit 201b. With the above configuration, focus detection can be performed using signals obtained from the photoelectric conversion units 201a and 201b. An image signal can be generated by adding the signals obtained from the photoelectric conversion units 201a and 201b.

In the present exemplary embodiment, the pixels illustrated in FIG. 2 are provided in the entire screen area of the imaging unit 22 so that any subject appearing on the screen can be focused by phase difference detection.

While the present exemplary embodiment will be described using the focus detection method described above, the focus detection method is not limited to the example. For example, the focus detection may be performed by providing the imaging unit 22 with pixels dedicated to focus detection illustrated in FIG. 3, which will be described below. Alternatively, the imaging unit 22 may be provided with only pixels for image capturing, without providing pixels for focus detection, and focus detection using a contrast method may be performed.

Figure 3:
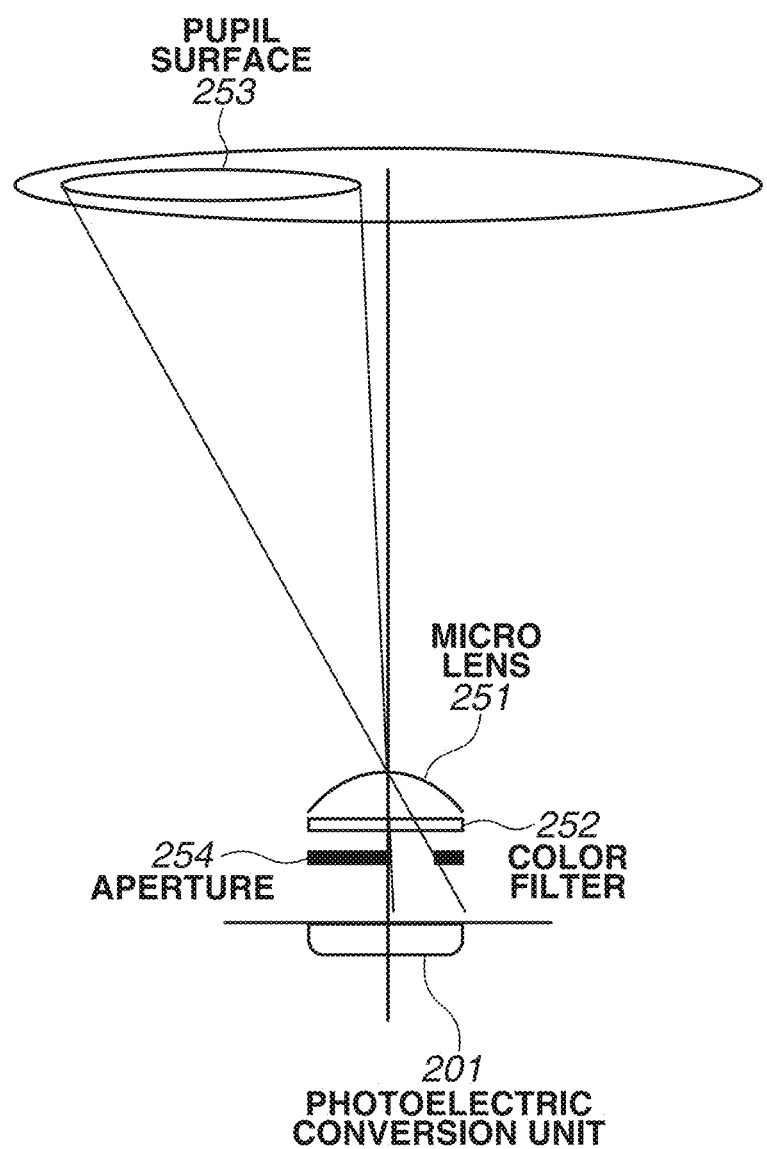
FIG. 3 illustrates a correspondence relationship between a pupil surface and an aperture of pixels of the imaging apparatus according to the second exemplary embodiment.

FIG. 3 illustrates a configuration of a pixel dedicated to focus detection and a correspondence relationship between a pupil surface and a photoelectric conversion unit. In contrast to FIG. 2, FIG. 3 illustrates a pixel dedicated to focus detection. The shape of a pupil surface 253 is determined by an aperture 254. Because only the light that passes through the pupil surface 253 is detected in the configuration, the other pixel to form a pair, that is, a pixel to detect light that passes through a pupil surface on the right (not illustrated in FIG. 3) needs to be provided so as to acquire focus detection signals. By providing the focus detection pixel illustrated in FIG. 3 and the imaging pixels in the entire screen area of the imaging unit 22, any subject appearing on the screen can be focused by phase difference detection.

The digital camera 100 described above can perform shooting using center-point AF or face AF.

The center-point AF is an AF mode in which one center point on an imaging screen is focused. The face AF is an AF mode in which a face on an imaging screen detected by a face detection function is focused.

The face detection function will be described. The system control unit 50 transmits image data about a face detection target to the image processing unit 24. The system control unit 50 controls the image processing unit 24 to apply a horizontal band-pass filter to the image data. The system control unit 50 controls the image processing unit 24 to apply a vertical band-pass filter to the processed image data. Edge components are detected from the image data with these horizontal and vertical band-pass filters.

Next, the system control unit 50 performs pattern matching on the detected edge components and extracts a candidate group of eyes, noses, mouths, and ears. The system control unit 50 determines eyes that satisfy predetermined conditions (for example, a distance between two eyes, an inclination, or the like) as pairs of eyes from the candidate group of extracted eyes and narrows down the components having the pairs of eyes as the candidate group of eyes. The system control unit 50 associates the narrowed-down eyes in the candidate group with other parts (nose, mouth, ears) that form a face corresponding to the eyes and filters the formed face through a predetermined non-face condition filter to detect the face. Depending on the face detection result, the system control unit 50 outputs the above face information and ends the processing. When ending the processing, the system control unit 50 stores feature amounts such as the number of faces in the system memory 52. The method for realizing the face detection function is not limited to the method described above. The number of faces, sizes, parts, and the like may be similarly detected by a method using known machine learning. The type of subject is not limited to a human face, An animal, a vehicle, or the like may also be detected.

As described above, it is possible to detect subject information by performing image analysis on image data on live view display or reproduction display and extracting feature amounts of the image data. In the present exemplary embodiment, the face information has been described as an example of the subject information. The subject information includes various types of information such as about red-eye determination, eye detection, eye-closure detection, and smiling face detection.

Face AE, face FE, and face WB can be performed simultaneously with the face AF. The face AE is to optimize the exposure of the entire screen in accordance with the brightness of a detected face. The face FE is to adjust flash light around a detected face. The face WB is to optimize the white balance (WB) of the entire screen in accordance with the color of a detected face.

A line-of-sight detection processing method of the electronic apparatus, line-of-sight position state determination, and a determination result according to a second exemplary embodiment will be described with reference to FIG. 12. FIG. 12 is a flowchart illustrating focus detection, line-of-sight detection, and a shooting operation of the electronic apparatus according to the present exemplary embodiment. FIG. 12 illustrates an operation performed at live view shooting, in which shooting is performed during a live view state (video shooting state) such as a shooting standby state, and the operation is realized mainly by the system control unit 50.

In step S11, in accordance with the control of the system control unit 50, the imaging unit 22 is driven to acquire imaging data. Because the imaging data acquired is not for an image for recording, which will be described below, but for an image for detection and display, imaging data whose size is smaller than that of a recording image is acquired. In step S11, the imaging unit 22 acquires an image having a sufficient resolution for performing focus detection, subject detection, or live view display. Because the driving operation in the step is for video shooting for live view display, shooting is performed by using an electronic shutter that performs charge accumulation and readout for time suitable for the frame rate for live view display. The live view displayed here is for the photographer to confirm the shooting range and shooting conditions and may be, for example, 30 frames per second (shooting intervals of 33.3 ms) or 60 frames per second (shooting intervals of 16.6 ns).

In step S12, the system control unit 50 acquires focus detection data obtained from a first focus detection pixel and a second focus detection pixel included in a focus detection area from among the imaging data obtained in step S11. The system control unit 50 generates an imaging signal by adding output signals of the first focus detection pixel and the second focus detection pixel and acquires image data obtained by causing the image processing unit 24 to perform interpolation processing or the like. Thus, the system control unit 50 can acquire the image data and the focus detection data from a single shooting. In a case where the imaging pixel is configured separately from the first and second focus detection pixels, image data is obtained by performing interpolation processing or the like on the focus detection pixels.

In step S13, the system control unit 50 generates an image for live view display by using the image processing unit 24 based on the image data obtained in step S12 and displays the generated image on the display unit 28. The image for live view display is, for example, a reduced image that matches the resolution of the display unit 28. The imaging processing unit 24 may perform reduction processing when generating the image data in step S12 in this case, the system control unit 50 displays the image data obtained in step S12 on the display unit 28. As described above, because shooting and display are performed at a predetermined frame rate during live view display, the photographer can adjust the composition and exposure conditions during shooting through the display unit 28. As described above, in the present exemplary embodiment, a human face, an animal, etc. can be detected as a subject. In step S3, a frame or the like indicating an area of the detected subject is also displayed at the start of the live view display. As in step S1 of the main flowchart of the first exemplary embodiment, instead of a live view image, an already acquired image may be displayed.

Next, steps S14 to S19 are performed. Because these steps are the same as steps S2 to S7 in the first exemplary embodiment, description thereof will be omitted.

In step S20, the system control unit 50 determines whether SW1 is ON. In a case where the system control unit 50 does not detect ON of the SW1 (or detects OFF of the SW1) (NO in step S20), the processing proceeds to step S28 and the system control unit 50 determines whether the main switch included in the operation unit 70 is turned off. In contrast, in a case where the system control unit 50 detects ON of the SW1 (YES in step S20), the processing proceeds to step S21, In step S21, a focus detection area to be focused is set, and focus detection is performed. In the step, the system control unit 50 sets a focus detection area by using the line-of-sight position detected in step S18. The line-of-sight position detected in step S18 has a deviation with respect to the position of the subject intended by the photographer due to various factors.

In step S21, the system control unit 50 sets the focus detection area by using the line-of-sight position information on which processing described below has been performed. At the time of the setting, the line-of-sight position and the central position of the focus detection area may be aligned. In a case where there is a candidate for the focus detection area by different means such as the subject detection unit a detected subject area may be associated with the line-of-sight position, and the subject area closest to the line-of-sight position may be selected as the focus detection area. After step S21, the setting of the focus detection area using the line-of-sight position information and the focus detection processing are repeatedly executed every time shooting is performed. Next, the focus detection processing will be described.

By using focus detection data corresponding to the set focus detection area, a defocus amount and a defocus direction are obtained for the individual focus detection area. In the present exemplary embodiment, the system control unit 50 generates an image signal for focus detection, calculates a deviation amount (phase difference) of the focus detection signal, and obtains a defocus amount and a defocus direction from the calculated deviation amount.

The system control unit 50 performs shading correction and filter processing on the first focus detection signal and the second focus detection signal obtained as image signals for focus detection from the set focus detection area, reduces a light amount difference of the pair of signals, and extracts a signal of a spatial frequency for performing phase difference detection. The system control unit 50 performs shifting processing for relatively shifting the filtered first focus detection signal and the filtered second focus detection signal in respective pupil division directions and calculates a correlation amount indicating the degree of coincidence of the signals.

A correlation amount COR is calculated by equation (6) using a filtered k-th first focus detection signal $A(k)$, a filtered second focus detection signal $B(k)$, a range W of the number k corresponding to the individual focus detection area, a shift s1 amount by the shifting processing, and a shift range $\Gamma 1$ of the shift amount s1.

$$COR(s_1)=\Sigma_{k\in W}|A(k)-B(k-s_1)|s_1\in\Gamma 1 \quad (6)$$

By performing the shifting processing of the shift amount s1, the k-th first focus detection signal $A(k)$ and the $(k-s1)$-th second focus detection signal $B(k-s1)$ are made to correspond to each other and subtracted from each other to generate a shift subtraction signal. The system control unit 50 calculates an absolute value of the generated shift subtraction signal, calculates the sum of the numbers k in the range W corresponding to the focus detection area, and calculates a correlation amount COR(s1) As needed, the correlation amount calculated for an individual row may be added up over a plurality of rows per shift amount.

Areal-valued shift amount at which the correlation amount becomes minimum is calculated from the correlation amount by sub-pixel calculation and is set as an image deviation amount p1. A detected defocus amount is obtained by multiplying the calculated image deviation amount p1 by a conversion coefficient K1 corresponding to an image height of the focus detection area, an F value of an imaging lens (an imaging optical system), and an exit pupil distance.

In step S22, the system control unit 50 drives the lens based on the defocus amount detected in the selected focus detection area. In a case where the detected defocus amount is less than a predetermined value, the lens does not necessarily need to be driven.

In step S23, the system control unit 50 performs acquisition of an image for detection/display and live view display performed in step S1 and the focus detection processing performed in step S6. The subject area detected as described above and the line-of-sight position information are also superimposed in the live view display. The processing in step S23 may be performed in parallel with the processing for driving the lens in step S22. The focus detection area may be changed to correspond to the line-of-sight position obtained in the live view display continually updated. When the focus detection processing is completed, the processing proceeds to step S24. In step S24, the system control unit 50 determines ON/OFF of the second shutter switch 64 (SW2) that indicates an instruction to start imaging. A release (imaging trigger) switch, which is one of the operation members of the operation unit 70, can detect two stages of ON/OFF in accordance with a pressing amount, and the above SW2 corresponds to the second stage of ON/OFF of the release (imaging trigger) switch. In a case where the system control unit 50 does not detect ON of the SW2 in step S24 (NO in step S24), the processing returns to step S20, and the system control unit 50 determines ON/OFF of the SW1.

The system control unit 50 performs subject detection in an image for detection acquired in step S1 and acquires information about the position and range of the detected subject. In the present exemplary embodiment, the line-of-sight position information is changed by using the acquired information about the detected subject and the line-of-sight position information obtained in step S18. Comparing the acquired information about the detected subject with the line-of-sight position information, in a case where the line-of-sight position is included in the detected subject range for a first determination number, the above-described stationary display determination is performed, and the line-of-sight information is stationarily displayed on the display unit 28. Even in a case where the line-of-sight position is not within the detected subject range, for example, a range around the detected subject range may be set as the determination range. Instead of being stationarily displayed, the line-of-sight information display may not be displayed.

In the present exemplary embodiment, a predetermined number N, a first determination number $JN_1$ and a second determination number $JN_2$ may be changed in accordance with an AF mode being set. The AF mode includes "one-shot AF mode" in which the above-described AF control operation is performed only once when the SW1 is detected in step S20 and "servo AF mode" in which the AF control operation is continuously performed while the SW1 detection is continued. The one-shot AF mode is often used, for example, when the composition is preset and a low-speed to stationary subject is captured. Thus, the first determination number and the second determination number are set to a larger number than those in the case where the servo AF mode is set, and the first threshold and the second threshold are also set to a larger value. In this way, the line-of-sight position display can be finely adjusted with respect to the subject. As a result, good line-of-sight display can be performed.

In contrast, the servo AF mode is often used, for example, when a medium-speed to high-speed subject that needs a framing operation is captured. Thus, the first determination number and the second determination number are set to a smaller number than those in the case where the one-shot AF mode is set, and the first threshold and the second threshold are also set to a smaller value. In this way, the dynamical display can be quickly performed. As a result, good line-of-sight display can be performed even for a quickly moving subject.

Instead of changing the setting in accordance with the AF mode as described above, the user may freely set the first determination number, the second determination number, the first threshold, and the second threshold.

In a case where the system control unit 50 detects ON of the SW2 in step S24 (YES in step S24), the processing proceeds to step S25. In step S25, the system control unit 50 determines whether to perform image recording. In the present exemplary embodiment, processing for acquiring images during continuous shooting is switched between processing for image recording and processing for imaging/display and focus detection. The switching may be alternately performed. For example, the processing for imaging/display and focus detection may be performed once in three times. In this way, highly accurate focus detection can be performed without significantly reducing the number of images captured per unit time.

In step S25, in a case where the system control unit 50 determines that processing for image recording is to be performed (YES in step S25), the processing proceeds to step S26, and an imaging subroutine is performed. Details of the imaging subroutine will be described below. When the imaging subroutine has been performed, the processing returns to step S24, and the system control unit 50 determines whether the SW2 is ON, that is, determines whether continuous shooting has been instructed.

In step S25, in a case where the system control unit 50 determines that processing for imaging/display and focus detection are to be performed (NO in step S25), the processing proceeds to step S27, and the system control unit 50 performs the processing for imaging/display and focus detection during continuous shooting. The imaging/display and focus detection processing during continuous shooting is performed in the same manner as in step S23. The difference is that, in accordance with a shooting frame speed of continuous shooting, processing for generating a recorded image, and the like, a display period, a display update rate (intervals), and a display delay of an image captured in step S27 are different from those in the processing in step S23. The system control unit 50 serving as the display unit performs these display control operations. As described above the obtained line-of-sight position information is used for setting the focus detection area and association with the detected subject area, for example. The details will be described below. When the imaging/display and focus detection processing during continuous shooting has been performed in step S27, the processing returns to step S24, and the system control unit 50 determines whether the SW2 is ON, that is, determines whether continuous shooting has been instructed. In a case where the system control unit 50 does not detect ON of the SW1 (or detects OFF of the SW1) in step S20 (NO in step S20) and detects that the main switch is OFF in step S28 (YES in step S28), the focus detection and shooting operation are ended. In a case where the system control unit 50 does not detect that the main switch is OFF in step S28 (NO in step S28), the processing returns to step S12, and image data and focus detection data is acquired.

The imaging subroutine performed in step S26 of FIG. 12 will be described in detail with reference to a flowchart illustrated in FIG. 13. A series of operations of the subroutine is also realized mainly by the system control unit 50.

In step S2601, the system control unit 50 performs exposure control processing to determine shooting conditions (shutter speed, aperture value, and shooting sensitivity). The exposure control processing can be performed by the system control unit 50 based on luminance information about the image data, and any known technique can be used. In the present exemplary embodiment, details such as the timing of obtaining image data used when the exposure control processing is performed will be described below. The operation of the shutter 101 is controlled based on the aperture value and shutter speed determined in step S2601. The system control unit 50 causes the imaging unit 22 to perform charge accumulation during a period in which the imaging unit 22 is exposed via the shutter 101.

When the exposure period ends, in step S2602, the system control unit 50 reads an image for high-pixel still image shooting, that is, reads all pixels. The system control unit 50 reads an image of either the first focus detection pixel or the second focus detection pixel. A signal read from the focus detection pixel is used for detecting the focus state of a subject during image reproduction. Thus, the amount of data to be read may be reduced by limiting the area of a recorded image obtained by high-pixel still image shooting or reducing the resolution of all pixels. In a case where a signal is obtained from either the first focus detection pixel or the second focus detection pixel, a focus detection signal of the other focus detection pixel can be obtained by calculating the difference from the image for high-pixel still image shooting. In the present exemplary embodiment, to prioritize the S/N of the signal of the image for high-pixel still image shooting, the image signal for high-pixel still image shooting and one of the focus detection signals are read out and recorded, and the other focus detection signal is obtained by calculation. Hereinafter, the processing for the image is performed on an image signal for high-pixel still image shooting and one of the focus detection signals.

In step S2603, the system control unit 50 causes the image processing unit 24 to perform defective pixel correction processing on the read image data. In step S2604, the system control unit 50 causes the image processing unit 24 to apply image processing such as demosaic (color interpolation) processing, white balance processing, γ correction (gradation correction) processing, color conversion processing, and edge enhancement processing, encoding processing, or the like to the image data on which the defective pixel correction has been performed. In step S2605, the system control unit 50 records the image signal for high-pixel still image shooting and one of the focus detection signals in the memory 32 as an image data file.

In step S2606, the system control unit 50 records, in association with the captured image recorded in step S2605, attribute information about the camera body in the memory 32 and the memory in the system control unit 50. Examples of the attribute information about the camera body include information as follows:
  shooting conditions (aperture value, shutter speed, shooting sensitivity, etc.);
  information related to image processing applied by the image processing unit 24;
  light receiving sensitivity distribution information about imaging pixels and focus detection pixels of the imaging unit 22;
  vignetting information about an imaging light beam in the camera body;
  information about distance from an attachment surface between the camera body and the lens unit to the imaging unit 22; and
  manufacturing error information.

Because the light receiving sensitivity distribution information about imaging pixels and focus detection pixels of the imaging unit 22 is information depending on an on-chip micro lens ML and a photoelectric conversion unit PD, information related to these members may be recorded. The light receiving sensitivity distribution information is information about sensitivity corresponding to a position at a predetermined distance on the optical axis from an imaging element. The light receiving sensitivity distribution information may include a change in sensitivity with respect to the incident angle of light.

In step S2607, the system control unit 50 records, in association with the captured image recorded in step S2605, attribute information about the lens unit in the memory 32 and the memory in the system control unit 50. Examples of the attribute information about the lens unit include information about an exit pupil, frame information, focal length and F-number information upon shooting, aberration information, manufacturing error information, subject distance information associated with a focus lens position upon shooting, and the like. In step S2608, the system control unit 50 records image-related information about the captured image in the memory 32 and the memory in the system control unit 50. The image-related information may include information related to a focus detection operation before shooting, subject movement information, information related to accuracy of the focus detection operation, and the like.

In step S2609, the system control unit 50 displays a preview of the captured image on the display unit 28, The operation enables the photographer to have a quick check on the captured image. Because the image used for the preview display performed in step S2609 is for the purpose of simple check on the image, various kinds of processing performed in steps S2603 and 2604 may not be performed. In a case where these various kinds of processing are not performed, the preview display in step S2609 can be performed in parallel with the processing after step S2603 so that the time lag from the exposure to the display can be reduced.

When the processing in step S2609 is completed, the system control unit 50 ends the imaging subroutine in step S26, and the processing proceeds to S24 in the main routine. In the present exemplary embodiment, during continuous shooting, the acquired image is displayed in both cases where the image is recorded in the imaging subroutine in step S26 and where the imaging/display and focus detection processing is performed during continuous shooting in step S27.

As described above, it is possible to provide an electronic apparatus that improves display quality and convenience by stationarily or dynamically displaying the line-of-sight position based on the line-of-sight position shift amount. In the present exemplary embodiment, the method for determining whether to perform stationary display or dynamical display in accordance with the AF mode or the subject detection has been described. The determination method, however, may be changed in accordance with the shooting mode such as moving image shooting or still image shooting and a difference in the operation methods of the shooting devices such as shooting using a viewfinder or shooting using a rear-side liquid crystal screen.

While the exemplary embodiments are implemented by a digital camera, the exemplary embodiments may be applied to any apparatus that performs line-of-sight detection. For example, the exemplary embodiments can be implemented by a head-mounted display, a smartphone, a personal computer (PC), and the like.

In the operations described with reference to the flowcharts in the above exemplary embodiments, the order of the steps may be changed as appropriate as long as the same object can be achieved.

In some exemplary embodiments of the present disclosure, a program that realizes at least one function of the above exemplary embodiments may be supplied to a system or an apparatus via a network or a storage medium, Some exemplary embodiments can also be realized by causing at least one processor included in a computer in the system or the apparatus to read and execute the program. Some exemplary embodiments can also be realized by a circuit (for example, an application-specific integrated circuit (ASIC)) that realizes at least one function of the above exemplary embodiments.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-109537, which was filed on Jun. 30, 2021 and which is hereby incorporated by reference herein in its entirety.

What is claimed is:

1. A control apparatus comprising:
at least one processor configured to:
acquire information corresponding to an observation position of an observer at a plurality of different timings; and
control a display unit to display an indicator corresponding to the observation position,
wherein the information is acquired by repeatedly detecting and accumulating the observation position at the plurality of different timings,
wherein in a case where a change of the observation position, based on the information corresponding to the observation position, is continuously smaller than a first threshold fora first number of the different timings, a display position of the indicator is not shifted, and
wherein in a case where the change of the observation position is continuously greater than a second threshold for a second number of the different timings, the display position of the indicator is shifted, and
wherein at least one of the first number of the different timings and the second number of the different timings is changed in accordance with at least one of a line-of-sight characteristic of the observer, a viewing state of the display unit, and a manual operation by the observer.

2. The control apparatus according to claim 1, wherein the at least one processor is further configured to, in a case where the change of the observation position continuously occurs in a predetermined direction, shift the display position of the indicator.

3. The control apparatus according to claim 2,
wherein the case where the change of the observation position in the predetermined direction continuously occurs is a case where a shift within a range corresponding to the predetermined direction occurs at least twice.

4. The control apparatus according to claim 1,
wherein the at least one processor is further configured to detect a position of a subject, and
wherein, in a case where the observation position approximately matches the position of the subject, the display position of the indicator is not shifted.

5. The control apparatus according to claim 1,
wherein the at least one processor is further configured to detect a position of a subject, and
wherein, in a case where the observation position approximately matches the position of the subject, the indicator is not displayed.

6. The control apparatus according to claim 1, wherein the at least one processor is further configured to change at least one of the first number of the different timings, the first threshold, the second number of the different timings, and the second threshold based on at least one of a horizontal position shift amount, a vertical position shift amount, and a position shift amount between two points.

7. The control apparatus according to claim 1,
wherein the at least one processor is further configured to control driving of a focus lens to drive the focus lens in a first driving mode, and repeatedly drive the focus lens in a second driving mode, and
wherein, in a case where the second driving mode is selected, the first threshold and the second threshold are smaller than the first threshold and the second threshold are in a case where the first driving mode is selected.

8. The control apparatus according to claim 7, wherein, in a case where the second driving mode is selected, the first number and the second number are smaller than the first number and the second number are in a case where the first driving mode is selected.

9. The control apparatus according to claim 1, wherein at least one of the first number of the different timings and the second number of the different timings is changed in accordance with the line-of-sight characteristic of the observer.

10. The control apparatus according to claim 1, wherein at least one of the first number of the different timings and the second number of the different timings is changed in accordance with the viewing state of the display unit.

11. The control apparatus according to claim 1, wherein at least one of the first number of the different timings and the second number of the different timings is changed in accordance with the manual operation by the observer.

12. The control apparatus according to claim 1, wherein in a case where the change in the observation position is continuously greater than the first threshold and smaller than the second threshold for the first number of the different timings at a first timing, the display position of the indicator is not shifted in a case where the display position of the indicator is not shifted immediately before the first timing, and the display position of the indicator is shifted in a case where the display position of the indicator is shifted immediately before the first timing.

13. A control method comprising:
acquiring information corresponding to an observation position of an observer at a plurality of different timings, wherein the information indicates a shift in the observation position; and
controlling a display unit to display an indicator corresponding to the observation position,
wherein the information is acquired by repeatedly detecting and accumulating the observation position at the plurality of different timings,
wherein, in the controlling, in a case where a change of the observation position is continuously smaller than a first threshold for a first number of the different timings, the display position of the indicator is not shifted, and
wherein in a case where the change of the observation position is continuously greater than a second threshold for a second number of the different timings, the display position of the indicator is shifted, and
wherein at least one of the first number of the different timings and the second number of the different timings is changed in accordance with at least one of a line-of-sight characteristic of the observer, a viewing state of the display unit, and a manual operation by the observer.

14. A non-transitory computer-readable storage medium storing a program for causing a computer to execute operations comprising:
acquiring information corresponding to an observation position of an observer at a plurality of different timings, wherein the information indicates a shift in the observation position; and
controlling a display unit to display an indicator corresponding to the observation position,
wherein the information is acquired by repeatedly detecting and accumulating the observation position at the plurality of different timings,
wherein, in the controlling, in a case where a change of the observation position is continuously smaller than a first threshold for a first number of the different timings, the display position of the indicator is not shifted, and
wherein in a case where the change of the observation position is continuously greater than a second threshold for a second number of the different timings, the display position of the indicator is shifted, and
wherein at least one of the first number of the different timings and the second number of the different timings is changed in accordance with at least one of a line-of-sight characteristic of the observer, a viewing state of the display unit, and a manual operation by the observer.

* * * * *